US010503739B2

(12) United States Patent
Natkin et al.

(10) Patent No.: US 10,503,739 B2
(45) Date of Patent: Dec. 10, 2019

(54) CROWDSOURCING RESPONSES IN A QUERY PROCESSING SYSTEM

(71) Applicant: Breville USA, Inc., Torrance, CA (US)

(72) Inventors: Michael Joshua Natkin, Seattle, WA (US); Christopher Charles Young, Seattle, WA (US)

(73) Assignee: Breville USA, Inc., Torrance, CA (US)

( * ) Notice: Subject to any disclaimer, the term of this patent is extended or adjusted under 35 U.S.C. 154(b) by 241 days.

(21) Appl. No.: 15/493,032

(22) Filed: Apr. 20, 2017

(65) Prior Publication Data

US 2018/0307687 A1 Oct. 25, 2018

(51) Int. Cl.
G06F 16/2457 (2019.01)
H04L 29/08 (2006.01)
G06F 16/248 (2019.01)

(52) U.S. Cl.
CPC ...... *G06F 16/24578* (2019.01); *G06F 16/248* (2019.01); *H04L 67/22* (2013.01)

(58) Field of Classification Search
CPC ... G06F 16/24578; G06F 16/248; H04L 67/22
USPC ........................................................ 707/728
See application file for complete search history.

(56) References Cited

U.S. PATENT DOCUMENTS

| | | | |
|---|---|---|---|
| 7,657,519 B2 * | 2/2010 | Anderson | G06F 16/337 707/999.005 |
| 8,521,688 B1 | 8/2013 | Belwadi et al. | |
| 9,098,808 B1 | 8/2015 | Ventilla et al. | |
| 9,280,610 B2 * | 3/2016 | Gruber | G06F 16/9535 |
| 9,318,108 B2 * | 4/2016 | Gruber | G10L 15/22 |
| 2003/0028441 A1 * | 2/2003 | Barsness | G06Q 30/02 705/26.1 |
| 2009/0125499 A1 * | 5/2009 | Cross | H04L 51/32 |
| 2009/0287644 A1 * | 11/2009 | Crosby | G06F 19/3475 |
| 2010/0161592 A1 * | 6/2010 | Zhao | G06F 16/80 707/722 |

(Continued)

FOREIGN PATENT DOCUMENTS

WO     2018195051     10/2018

OTHER PUBLICATIONS

Darianian, Mohsen, et al., "Smart Home Mobile RFID-based Internet-Of-Things Systems and Services", ICACTE 2008, Phuket, Thailand, Dec. 20-22, 2008, pp. 116-120.*

(Continued)

*Primary Examiner* — Robert Stevens
(74) *Attorney, Agent, or Firm* — Seed IP Law Group LLP

(57) ABSTRACT

Embodiments are disclosed for a query processing system configured to receive user submitted questions and provide answers to the user submitted questions. In an example embodiment a system receives a user query from a user. The system then determines if a response is available that matches an intent of the user query above a threshold confidence level. The systems then prompts the user for permission to enable access to the user query to other users. If permission is granted, the system then enables access to the user query to the user users. Responses to the user query received from one or more of the other users are then output to the user, for example, via a computing device or an appliance. Further, in some embodiments, feedback received from the user regarding output responses can be used to train machine learning models associated with the system.

23 Claims, 17 Drawing Sheets

(56) References Cited

U.S. PATENT DOCUMENTS

| | | | |
|---|---|---|---|
| 2012/0331391 A1 | 12/2012 | Kanjirathinkal et al. | |
| 2013/0149679 A1* | 6/2013 | Tokuda | G09B 19/0092 434/127 |
| 2013/0304758 A1* | 11/2013 | Gruber | G06F 16/9535 707/769 |
| 2014/0164476 A1* | 6/2014 | Thomson | G06Q 10/101 709/203 |
| 2014/0207794 A1* | 7/2014 | Du | H04L 51/32 707/748 |
| 2015/0066479 A1* | 3/2015 | Pasupalak | G06F 17/27 704/9 |
| 2016/0260433 A1 | 9/2016 | Sumner et al. | |
| 2016/0292582 A1 | 10/2016 | Kozloski et al. | |
| 2017/0242886 A1* | 8/2017 | Jolley | G06F 17/2705 |
| 2017/0242899 A1* | 8/2017 | Jolley | G06F 3/0482 |
| 2017/0243107 A1* | 8/2017 | Jolley | G06N 3/006 |
| 2018/0032890 A1* | 2/2018 | Podgorny | G06N 7/005 |
| 2018/0157936 A1* | 6/2018 | Lee | G06K 9/00671 |

OTHER PUBLICATIONS

Perera, Charith, et al., "A Survey on Internet of Things From Industrial Market Perspective", IEEE Access, vol. 2, Jan. 26, 2015, pp. 1660-1679.*

Chilana, Parmit K., et al., "LemonAid: Selection-Based Crowdsourced Contextual Help for Web Applications", CHI '12, Austin, TX, May 5-10, 2012, pp. 1549-1558.*

International Searching Authority, International Search Report and Written Opinion, PCT Patent Application PCT/US2018/027926, dated Jul. 30, 2018, 15 pages.

\* cited by examiner

CROWDSOURCING RESPONSES IN A QUERY PROCESSING SYSTEM

TECHNICAL FIELD

The present disclosure generally refers to automated dialog systems, and more specifically to automated dialog systems for answering user queries that can leverage responses provided by other users. Some embodiments describe the integration of such automated dialog systems with systems for providing control of food preparation, for example, via a network connected cooking appliance.

BACKGROUND

Recent advances in natural language processing and artificial intelligence have allowed for automated dialog systems (sometimes referred to as "chatbots") through which human users can interactively communicate with computing systems as if they were communicating with another human. Such systems can be programmed to perform certain tasks such as provide answers to user submitted questions in a natural language format that simulates human interaction. Automated dialog systems are currently implemented in a number of applications for example as digital customer service representatives or personal digital assistants such as Amazon® Alexa.

BRIEF DESCRIPTION OF THE DRAWINGS

One or more embodiments of the present disclosure are illustrated by way of example and not limitation in the figures of the accompanying drawings, in which like references indicate similar elements.

DETAILED DESCRIPTION

Figure 1:
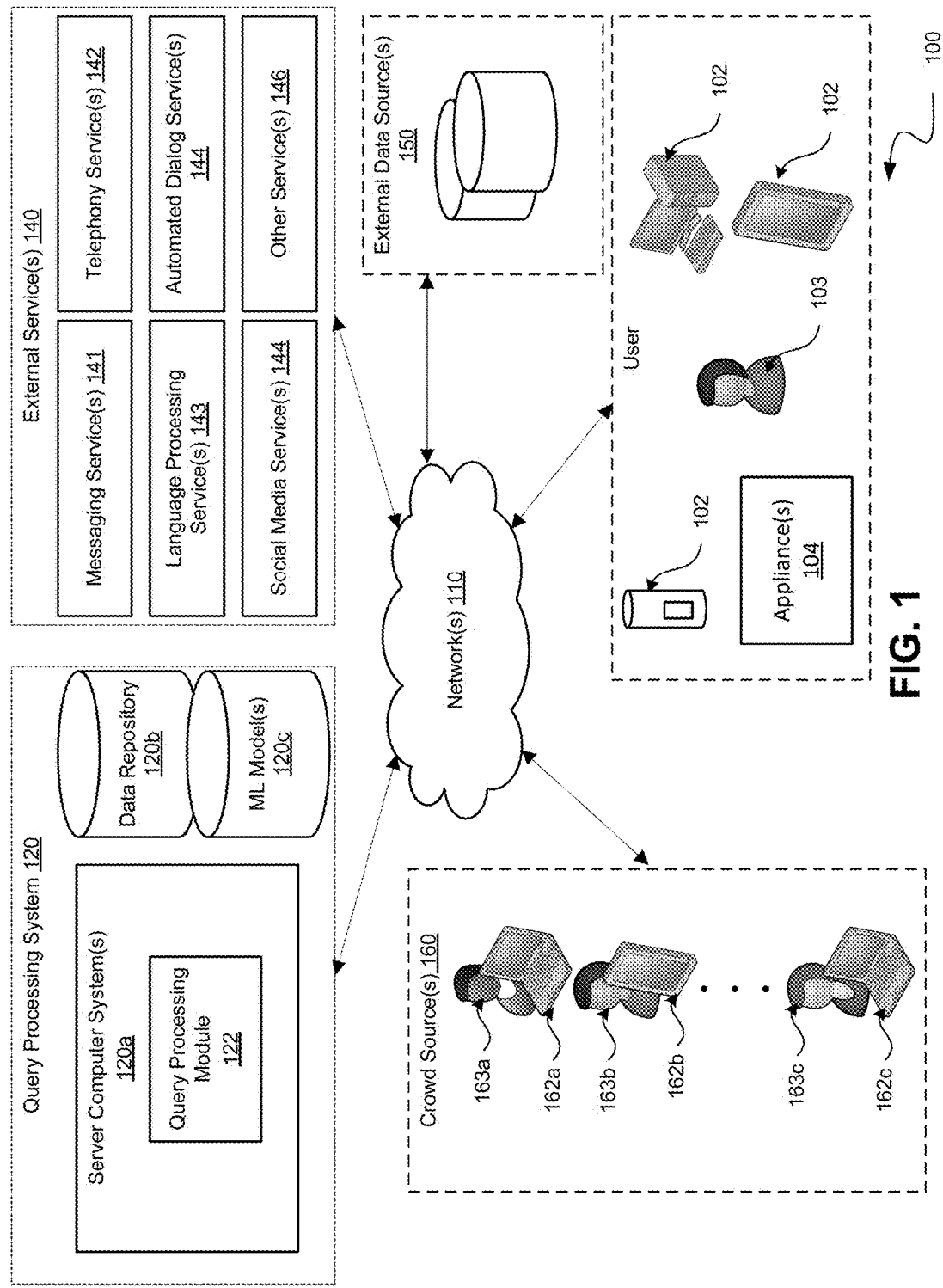
FIG. 1 shows an example networked environment in which a query processing system may be implemented.

From the foregoing, it will be appreciated that specific embodiments of the invention have been described herein for purposes of illustration, but that various modifications may be made without deviating from the scope of the invention. Accordingly, the invention is not limited except as by the appended claims.

Overview

Recent advances in natural language processing and artificial intelligence have allowed for increasingly advanced automated dialog systems ("chatbots"). While effective to an extent, the ability of such automated dialog systems to interpret user communications and provide accurate and effective responses to the user communications is limited by the current state of natural language processing, the general complexity of artificial intelligence, and the knowledge base upon which such artificial intelligence is based. These limitations can become particularly evident in certain spaces such as the culinary space where users may input vastly different messages such as:

"Can I cook boil vegetables with this cooking appliance?"
"Are there any available discounts for the cooking appliance?"
"how long should I roast a turkey?"
"Can you guys plleeaassee come up with an ultimate muffin recipe?"
"What should I serve with my steak?"

Training models (e.g., machine learning models) associated with an automated dialog system to respond to even a small fraction of such user queries presents a daunting challenge. Instead, the knowledgebase of a community other users including users with expertise in particular spaces such as the culinary space may be leveraged by crowdsourcing some responses and using those crowdsourced responses in part to train the models. Introduced herein are techniques for processing user queries to provide automated responses that in some cases include responses sourced from a community of other users. Certain embodiments of the techniques described herein can be summarized by the following process:

1. A user submits a message to a system including a query
2. The system determines if a response is available that matches an intent of the query above a threshold level of confidence.
3. If such a response is not available, the system prompts the user for permission to enable access to the query to a plurality of other users.

4. If the user confirms permission, the system enables access to the query to the plurality of other users.
5. The system receives responses from one or more of the plurality of other users.
6. The system outputs the received responses to the user.
7. The system prompts the user for feedback regarding the output responses.
8. The system is trained based on feedback received form the user.

In some embodiments, the above described techniques for responding to user queries may be implemented by or in conjunction with a food preparation guidance system, for example, similar to the systems described in U.S. patent application Ser. No. 14/789,414 (U.S. Publication No. 2016/0005327), entitled, "Systems, Articles and Methods Related to Providing Customized Cooking Instruction," filed Jul. 1, 2015, U.S. patent application Ser. No. 14/974,635 (U.S. Publication No. 2016/0174748), entitled, "Food Preparation Guidance System," filed Dec. 18, 2015, and U.S. patent application Ser. No. 15/009,525 (U.S. Publication No. 2016/0220064), entitled "Food Preparation Control System" filed Jan. 28, 2016, all of which are hereby incorporated by reference in their entireties.

Example Operating Environment

FIG. 1 shows an example networked environment 100 for use in providing automated answers to user questions. As illustrated in FIG. 1, the networked environment 100 may include a query processing system 120, one or more client computing devices 102, one or more network-connected appliances 104, one or more external services 140, one or more external data sources 150, and one or more crowd sources 160. Entities (e.g., devices, users, software, etc.) associated with the aforementioned components of networked environment 100 may be communicatively coupled together via one or more communications channels, for instance communications networks 110 (e.g., LAN, WAN, Internet, Worldwide Web, cellular network, USB®, Bluetooth®, WIFI®, NFC).

The query processing system 120 may take the form of one or more server computer systems 120a with associated non-transitory processor-readable storage media or other data storage facilities. For example, the query processing system 120 depicted in FIG. 1 includes a data repository 120b and a repository of one or more machine learning models 120c that may be employed when implementing the techniques described herein. While illustrated as a single server computer system 120a and associated non-transitory storage media 120b-c, many implementations may employ two or more server computer systems 120a and/or non-transitory associated processor- or computer-readable storage media 120b-c. Further, the server computer systems 120a depicted in FIG. 1 may represent physical hardware devices and/or virtualized devices instantiated at one or more physical computing devices at a single physical location or distributed at multiple physical locations. In some implementations or instances, the non-transitory processor-readable or computer-readable media 120b-c may include a database or other data structure which stores one or more of: image data, video data, audio data, text data, machine learning models, lookup tables, natural language processing algorithms, customer identifiers, customer account identifiers, customer identity information, financial account information (e.g., credit and/or debit account numbers, expiration dates, security codes), user history, crowd-sourced data, and/or other data or statistics.

The query processing system 120 can include a query processing module 122. Although depicted in FIG. 1 as being part of server computer systems 120a, the query processing module 122 may include any combination of hardware and or/software for executing instructions to carry out the functionalities described herein. For example, the query processing module 122 may be implemented as software instantiated in a computer-readable medium or computer-readable storage medium (e.g., a storage medium internal to server computer systems 120a or external to server computer systems 120a such as repository 120b) on a machine, in firmware, in hardware, in a combination thereof, or in any applicable known or convenient device or system. This and other modules, submodules, or engines described in this specification are intended to include any machine, manufacture, or composition of matter capable of carrying out at least some of the functionality described implicitly, explicitly, or inherently in this specification, and/or carrying out equivalent functionality. Further, while depicted in FIG. 1 as a single query processing module 122, in some embodiments, the functionalities described herein can be carried out by or in conjunction with multiple other modules not depicted in FIG. 1.

In some implementations, a user 103 may utilize the client computing device 102 and/or an associated appliance 104 to interact with the query processing system 120. For example, the client computing device 102 or appliance 104 may execute a program or "app" that communication with the query processing system 120 via any suitable communications interface (e.g., Bluetooth®, USB®, WIFI®). A client computing device 102 may include any number of types of devices configured to process data and communicate with other devices via network 110. Examples of such devices include desktop computers, laptop computers, smart phone devices, tablet devices, digital assistant devices (e.g., Amazon Echo™), wearable computing devices, smart televisions, video game consoles, etc. Appliances 104 may generally refer to devices intended for a purpose other than computing but that also include means for communicating via one or more networks 110. Such appliances 104 may in some instances be referred to as "smart appliances," "smart devices," or "internet of things (JOT)" devices. For example, embodiments will be described herein that include a cooking appliance configured to cook food that includes means for communicating with another user device 102 and/or a query processing system 120. A cooking appliance is one example of an appliance 104, other illustrative examples include other home appliances (e.g., refrigerators, washing machines, etc.), building automation devices, devices associated heating ventilation and cooling (HVAC) systems, smart meters, vehicles, etc. Although depicted in FIG. 1 as apart from client computing device 102, appliances 104 may in some embodiments include one more functional components similar to that of a client computing device 102. Accordingly, in some embodiments computing device 102 and appliances 104 may be collectively referred to as client computing devices.

As will be described in more detail, a user 103 may use a client computing device 102 and/or appliance 104 to interact with the query processing system 120 to seek answers to questions. Specifically, user may use a client computing device 102 and/or appliance 104 to input questions as messages, for example via text or voice. Similarly, in some embodiments the user 103 may receive responses from the query processing system 120 and/or various crowd sources 160 via the client computing device 102 and/or appliance 104. Further, the user 103 may input feedback regarding received responses via a client computing device 102 and/or appliance 104.

While generally described below in terms of a user interface generated via instructions executing on a computing device, in some implementations the query processing system 120 may serve as a user portal that may operate, for example, as a Web server, serving HTML pages or providing Web services which function as the user interface. Thus, in some implementations, the query processing system 120 serves as a user portal, providing a user interface, for instance a Web based interface, which allows users 103 access functionality disclosed herein via various processor-based computing devices 102.

A user interface displayed on the display of the computing device 102 may include various pull-down menus, tabs, user selectable icons, input fields, scroll bars, images, videos, audio, and dialog boxes, as well as other user interface components. The user interface may allow a user 103 to create a user or customer account using the computing device 102. The user 103 may enter their full name, screen name or nickname, address, and/or date of birth. The user 103 may optionally enter financial account information, for instance an account number, expiration date, and validation or security code associated with a charge or debit account. This allows automated charging or debiting on purchase of items, goods or services by the user 103.

The various systems, subsystems, and/or processor-based devices are capable of communications, for example, via the one or more networks 110 which may be, for instance, packet switched communications networks, such as the Internet, Worldwide Web portion of the Internet, extranets, intranets, and/or various other types of telecommunications networks such as cellular phone and data networks or channels, and plain old telephone system (POTS) networks. The type of communications infrastructure should not be considered limiting. The communications networks 110 may take any of a large variety of forms, and may include modems (e.g., DSL modem, cable modem), routers, network switches, and/or bridges, etc.

While often illustrated as a single non-transitory processor-readable storage medium, in many implementations each of the various illustrated non-transitory computer-readable or processor-readable storage media may constitute a plurality of non-transitory storage media. The plurality of non-transitory storage media may be commonly located at a common location, or distributed at a variety of remote locations. Database(s) may be stored separately from one another on separate computer-readable or processor-readable storage medium or may be stored on the same computer- or processor-readable storage medium as one another. Various computer- or processor-readable storage medium may be co-located with the corresponding computer systems, for example, in the same room, building or facility. Alternatively, various computer-readable or processor-readable storage medium may be located remotely from the corresponding computer systems (e.g., server computer systems 120a for example, in a different facility, city, state or country. Electronic or digital information, files or records or other collections of information may be stored at specific locations in non-transitory computer- or processor-readable media, thus are logically addressable portions of such media, which may or may not be contiguous.

As shown in FIG. 1, networked environment 100 may include one or more external services 140 that may be accessed by query processing system 120, for example, via networks 110. "External" in this context refers to services generated, provided, managed, owned etc. by an entity other than a provider of query processing system 120. In other words, external services 140 may include services offered by a third-party such as Facebook® or Google® (e.g., via an API) that expands and/or off-loads certain functionalities described herein with respect to the query processing system. As an illustrative example, communication between users 103 and the query processing system 120 may be handled by an external messaging service 141 such as Facebook® Messenger. External services 140 may further include telephony services 142 (e.g., provided by a telephone utility or cellular service provider) for handling voice communications between users 103 and query processing system 120. External services 140 may further include natural language processing services 143 for interpreting and/or generating communications in a human language. External services 140 may further include external automated dialog services 144 configured to engage in natural language communications with human users. Such services may in some embodiments include computer programs generally referred to as "bots" or more specifically to "conversational bots" or "chatbots" For example, the Facebook® Messenger platform offers services via an API that enable the implementation of such bots. External services 140 may further include social media services 144 through which various users can connect. For example, as will be described, an aspect of the present disclosure deals with crowdsourcing user submitted queries for answers from other users. In some embodiments, the process of crowdsourcing may include enabling access to the user submitted questions to other users via one or more social media platforms. External services 140 may further include any other external services 146 that may be utilized to implement the functionalities described herein such as search engine services, e-commerce services, data analytics services, data storage services, cloud-computing services, location services, etc.

The external services 140 described with respect to FIG. 1 may be implemented using one or more server computer systems with associated non-transitory processor-readable storage media or other data storage facilities, for example similar to as described with respect to server computer systems 120a and associated storage facilities 120b-c. In some embodiments, portions of external services 140 may be implemented in hardware and/or software at the query processing system 120. A person having ordinary skill will recognize that the external services 140 depicted in FIG. 1 are examples provided for illustrative purposes. In some embodiments, query processing system 120 may access fewer or more external services 140 than as depicted in FIG. 1 or may perform all functionalities internal and not access any external services 140 at all.

Networked environment 100 may include one or more external data sources 150 that may be accessed by query processing system 120, for example, via networks 110. As with the external services 140, "external" in this context refers to data sources provided, managed, owned etc. by an entity other than a provider of query processing system 120. For example, depending on the particular implementation, query processing system 120 may be configured to receive data from one more external data sources 150 to facilitate in the answering of user queries. For example, in a specific implementation as part of a food preparation guidance system (described in more detail later) query processing system 120 may be configured access data from one or more external databases that include stored data related to food, food preparation, food cooking appliances, etc.

The external data sources 150 described with respect to FIG. 1 may be implemented using one or more server computer systems with associated non-transitory processor-readable storage media or other data storage facilities, for example similar to as described with respect to server computer systems 120a and associated storage facilities 120b-c. A person having ordinary skill will recognize that the external data sources 150 previously described are examples provided for illustrative purposes. In some embodiments, query processing system 120 may access fewer or more external data sources 150 or may perform all functionalities based on internal data sources and access any external data sources 150 at all.

As will be described in greater detail, in some embodiments query processing system 120 allows for the "crowdsourcing" of answers to user queries when the system is not otherwise able to produce a sufficient response to the user query. The term "crowdsourcing" as applied to information gathering can generally refer to the gathering of information from one or more other sources, in some cases other human sources. Accordingly, as shown in FIG. 1, in some embodiments the networked environment 100 may include one or more "crowd sources" 160 of information that may be accessed by query processing system 120, for example, via networks 110. Specifically, in some embodiments, the set of crowd sources 160 may include one or more other users 163a-c in communication with the query processing system 120, via one or more computing devices 162a-c (respectively) connected to network(s) 110. Computing devices 162a-c may generally be similar to client computing devices 102 and/or appliances 104.

While FIG. 1 illustrates a representative networked environment 100, typical networked environments may include many additional computer systems and entities. The concepts taught herein may be employed in a similar fashion with more populated networked environments than that illustrated in FIG. 1. For example, there are likely hundreds, if not thousands or even millions of user 103 and 163a-c, computing devices 102 and 162a-c, and appliances 104. There may be more than one query processing system 120, for example, located in different countries or regions within a country. Further, some or all of the query processing system 120 may be implemented within the computing devices 102, computing devices 162a-c, and/or the appliances 104.

Example Query Processing Module

Figure 2:
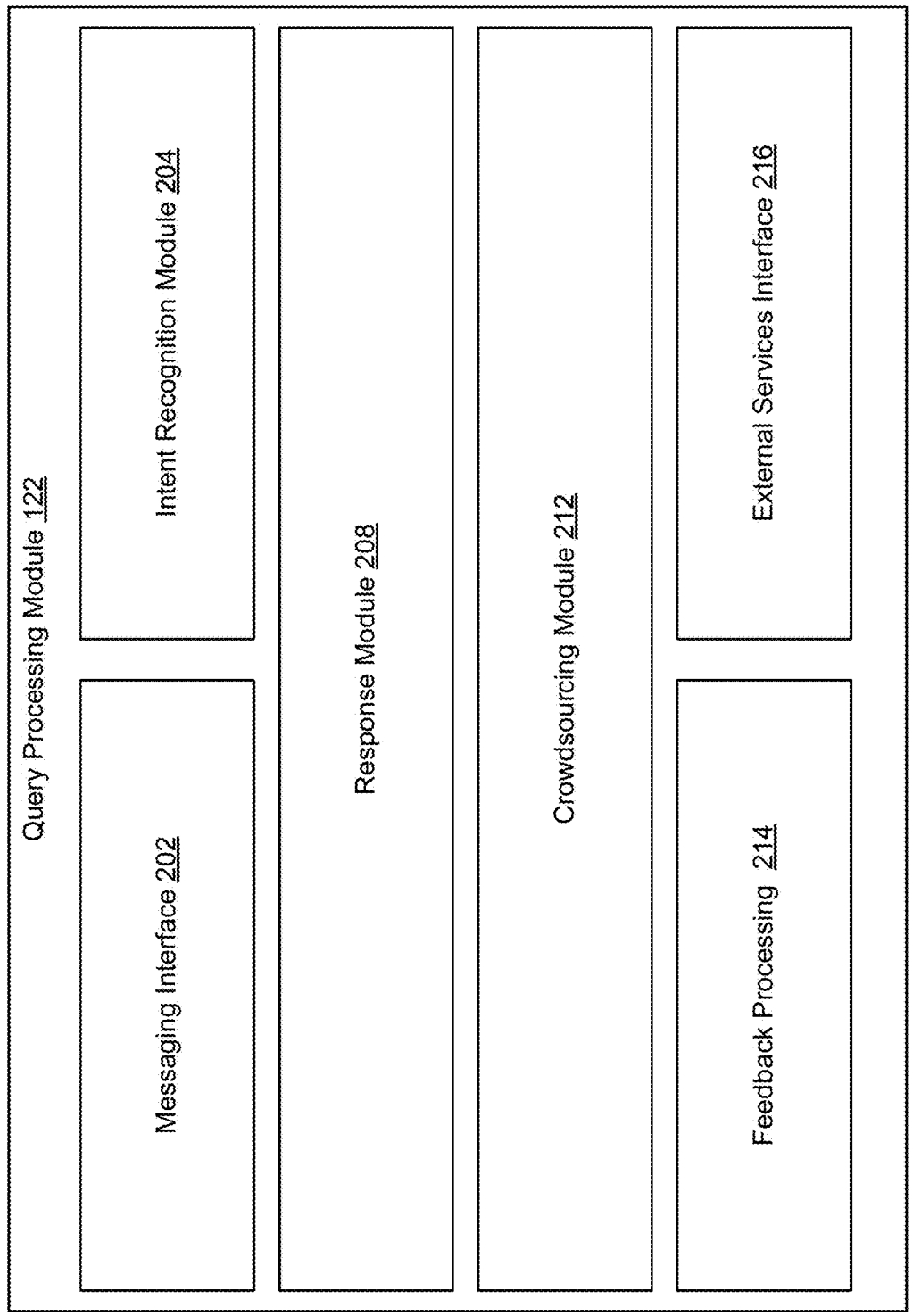
FIG. 2 is a block diagram that illustrates an example query processing module that may be part of the query processing system of FIG. 1.

FIG. 2 is a block diagram that illustrates an example query processing module 122 in accordance with one or more embodiments. The query processing module 122 may be implemented, for example, as part of any query processing system 120 and/or any of the other systems or devices described with respect to FIG. 1. The example query processing module 122 depicted in FIG. 2 includes various modules or submodules for performing certain aspects of the techniques describe herein. For example, query processing module 122 includes a messaging interface 202, an intent recognition module 204, a response module 208, a crowdsourcing module 212, a feedback processing module 214, and an external interface 216. It shall be appreciated that the modules depicted in FIG. 2 as being part of query processing module 120 are examples provided for illustrative purposes and are not to be construed as limiting. For example, certain embodiments of the present innovation may include fewer or more functional operations than as described with respect to query processing module 122 and may therefore have fewer or more submodules. Further, the functionalities and features of the described modules may be combined (e.g., shared) or divided (e.g., distributed) in to more of fewer modules than as shown in FIG. 2. As just an illustrative example, the intent recognition module 204 tasked with determining an intent of a received message may in some embodiments be integrated with the response module 208 and/or feedback processing module 214. Further, certain processes are described below as being performed by or in conjunction with certain modules for illustrative purposes. These examples are not to be construed as limiting. In some embodiments, processes described below may be performed by other modules, devices, or systems, or may not be performed at all. It shall also be understood that one or more of the modules described herein and/or their associated functionalities may be similarly implemented in the query processing module 422 or overall Food Preparation Guidance (FPG) system 420 described later with respect to FIG. 4A.

In an embodiment, the messaging interface 202 may receive and/or transmit messages to, from, and between any of the query processing system 120, client computing devices 102 and appliances 104 associated with a user 103, and/or computing devices 162a-c associated with various other users 163a-c. As used herein messages may refer to any type of communication over network(s) 110 such as text-based communications (e.g., email, SMS, instant message, paging, notifications, etc.), audio-based communications (e.g., regular voice, VOIP, cellular voice, audio steaming, voice texts, MMS, etc.), image/video-based communications (e.g., video calls/chat, video streaming, MMS, etc.). For example, in some embodiments, messages (e.g., text, audio, video, etc.) input by a user 103 via a computing device 102 and/or appliance 104 are received at the query processing system 120 via the messaging interface 202. These messages are then handed off, for example, to the intent recognition module 204 to interpret the received messages as user queries. Similarly, in some embodiments, generated or accessed responses to user queries may be output by the messaging interface 202 for delivery to a user 103, for example by transmitting the responses as messages via network(s) 110 for output at any of a client computing device 102 or an appliance 104. In some embodiments, user queries submitted by users 103 may be output as messages for delivery to one or more other users 163a-c, for example, as part of a crowd-sourcing process in conjunction with crowdsourcing module 212. In such embodiments, these messages may be transmitted via network(s) 110 for output at any of a computing devices 162a-c associated with the other users 163a-c (respectively). Similarly, in some embodiments, responses in the form of messages from the one or more other users may be received at the query processing system 120 via the messaging interface 202. These received messages can then be processed at query processing system 122 and/or forwarded along to a user 103, for example via networks 110 and any of computing device 102 or appliances 104.

As previously alluded to, one or more of the processes described with respect to modules included in the query processing module 122 may be handled by one or more external services 140. For example, in some embodiments the messaging interface 202 depicted in FIG. 2 may interface with an external messaging service 141 (e.g., Facebook® Messenger) and or telephony service 142 (e.g., an SMS provider) that may in turn handle the transmission, receipt, and routing of messages to, from, and between any of the query processing system 120, client computing devices 102 and appliances 104 associated with a user 103, and/or computing devices 162a-c associated with various other users 163a-c.

In an embodiment, the intent recognition module 204 may receive messages from users 103 and/or 163a-c, for example via the messaging interface 202, and process the messages to determine one or more intents associated with the received messages. Note that as used herein the verb "determine" is interpreted generally to include terms such as "guess," "infer," "interpret," etc. as it is understood that in any determination of a communicated intent there is some degree of uncertainty. Determining an intent associated with a message received from a human user can in some cases include processes referred to "natural language processing." In general, the natural language processing can take a communicated sequence of words and determine an intent of the person from which the sequence of words originated.

As previously mentioned, messages may be received in a number of different formats such as various text, audio, and image/video based formats. Accordingly, in some embodiments, a first step in determining an intent of a received message may be to convert the message from the received format into a sequence of words that may be recognizable to an intent recognition module. In the case of text-based communications, this conversion may be relatively straight forward. However, use of audio and/or image/video based messages may require an additional layer of inference. For example, received audio messages may be processed using voice-to-text recognition techniques to convert the received audio into sequences of words. Similarly received image/video messages may be processed using text recognition and/or computer vision techniques covert received images/video into sequences of words. For example, consider a video message received from a user 103 communicating via a sign language. In such a case, the intent recognition module 204 may first have to process the received video using computer vision techniques to identify a sequence of recognizable signs and then convert that sequence into a sequence of words.

In some embodiments, the intent recognition module 204 may parse a sequence of words associated with a received message in order to determine an intent associated with the message along with one or more variable properties associated with the intent. For example, consider an example received message including or associated with the text string, "what temperature should I cook my steak." By analyzing the words includes in the string and their sequencing, the intent recognition module 204 may at the very least interpret the message as a user query. For example, the inclusion and ordering of the term "what," in this context strongly suggests an interrogatory intent. Beyond the general interpretation of the message as a user query, the intent recognition module may be further operative to determine a specific intent of the user query based on the sequence of words. For example, the above mentioned string may be determined to have a specific intent of "cooking time." In some embodiments, the intent recognition module 204 may utilize a set of predefined intents and may process the sequence of words to determine a particular intent of the set of predefined intents that is most closely associated with the sequence of words. For example, in the context of a food preparation guidance system 420 (FIGS. 4A-4C), the intent recognition module 204 may access a repository 420b that includes a set of predefined intents related to food, food preparation, cooking appliances, etc. As illustrative examples, intents related to food and cooking may include, "cooking temperature," "cooking time," "appliance instructions," "recipes," "measurement conversions," "ingredient substitutions," etc.

As suggested, in addition to determining an intent associated with a message, the intent recognition module 204 may be further operable to extract one or more variable properties associated with the intent. For example, consider again the text string, "what temperature should I cook my steak." Having interpreted the messages associated with the text string is a user query, and further having determined that the intent of the user query is "cooking time," the intent recognition module 204 may further extract variable properties such as the object in the sentence (in this case "steak") and/or the subject in the sentence (in this case "I" referencing the user). Variable properties may in some cases be extracted from other aspects of the word sequence. For example here, the verb "cook" is general and does not necessarily refer to a specific cooking method, but it is conceivable that variable properties may be extracted from the action verb in a similar message, for example where the cooking related verb is more specific such as "grill," "roast," bake," "boil," etc. As with intent determination, the intent recognition module 204 may utilize a set of predefined variable properties and may process the sequence of words according to the set of predefined variable properties. For example, in the context of a food preparation guidance system 420 (FIGS. 4A-4C), the intent recognition module 204 may access a repository 420b that includes a set of predefined variable properties related to food, food preparation, cooking appliances, etc. As illustrative examples, variable properties related to food and cooking may include, "food item," "cooking method," "unit of measurement," "temperature," "time," "altitude," "cooking appliance," etc. Further, each predefined variable property may be associated with one or more possible values. For example variable properties such as "food item," may be associated with one or more possible categorical values such as, "steak," "eggs," "broccoli," etc. In contrast, variable properties such as "temperature," may be associated with variable numerical values.

In some embodiments, the intent recognition module 204 may output determined intents and/or variable properties as structured data. For example, consider the text string, "how long should I roast a twelve pound turkey" resulting from a message (text or otherwise) from a user. The intent recognition module 204 may process the text string and output the following structured data:

text=how long should I roast a twelve pound turkey
    intent=cooking time
    food item=whole turkey
    food item weight=12 lbs.
    cooking method=roast
    temperature=
    altitude=

As suggested above, in some embodiments, the intent recognition module 204 may infer certain information regarding the one or more variable properties. For example, the intent recognition module 204 may infer based on the combination of the terms "roast," and "twelve pounds," that the user is asking how to roast a whole turkey as opposed to a turkey breast or a dish including ground turkey.

Also, as suggested above, in some situations, the content of the message may not include certain information that is otherwise applicable to setting variable properties associated with a particular intent. For example, in some embodiments, the "cooking time" intent may be linked to variable properties such as "temperature" and/or "altitude" as these factor may impact the answer to the question. The received message, "how long should I roast a twelve pound turkey" does not include any words indicative of values to set for these two variable parameters. In some embodiments, if a value for a give variable parameter is not extractable from the word sequence, intent recognition module 204 may simply leave those values undefined, for example as shown above. Optionally, in some embodiments, intent recognition module 204 may output default values for undefined variable parameters. For the example above, the intent recognition module 204 may output "temperature=400° F." and "altitude=0" as default values. Optionally, in some embodiments, intent recognition module 204 may use contextual information to further define certain variable parameters. In other words, in some embodiments the intent recognition module 204 may output values based on inputs other than the message content. For example, the intent recognition module 204 may receive temperature data from an appliance 104 (e.g., cooking appliance 404 in FIGS. 4A-4C). If a user is cooking with an appliance set to 400°Fahrenheit ("F") and inputs a query asking how long to roast a turkey, the intent recognition module 204 may infer that the user is asking how long to cook a turkey at 400° F. Similarly, information such as altitude data may be received from sensors associated with a computing device 102 with or without any direct input from the user 103.

In some embodiments, the processes of interpreting messages, determining intents associated with messages, and or determining various parameters associated with the intents may be performed using one or more machine-learning based models (supervised, unsupervised, or otherwise) (e.g., stored in repository 120*c*). Some example machine learning models include decision trees, statistical-based models (e.g., linear regression, logistic regression, etc.), classification models (e.g., Naïve Bayes), neural networks, etc. Machine learning models used to answer user queries may be trained in part based on historical information such as previously received messages and/or user feedback.

As previously alluded to, one or more of the processes described with respect to modules included in the query processing module 122 may be handled by one or more external services 140. For example, in some embodiments processes described above as being performed by the intent recognition module 204 depicted in FIG. 2 may instead be performed by one or more external services 140 such as natural language processing services 143 and/or automated dialog services 144. For example, in some embodiments the query processing system 120 may interface with an external chatbot engine hosted on another platform such as Facebook® Messenger.

In some embodiments, the response module 208 may process the received message to determine if a user's query can be answered. For example, in some embodiments, the process of answering or attempting to answer a user's query may be based at least in part on the structured data output by the intent recognition module 204.

In some embodiments the process of answering a user's query may include determining if a response is available that matches the determined intent of the user query above a threshold confidence level. In this context, a response may be "available" as a stored predetermined response (e.g., a set string of words). This is generally referred to as a retrieval based model. In other embodiments, a response may be determined to be "available" if the requisite information is accessible and a response can be generated by the query processing system 120. In other words, if the query processing system 120 is capable of answering the user's query. This is generally referred to as generative model. For example, if the user query is "how long should I roast a twelve pound turkey," a response may be determined by the response module 208 to be "available" if the requisite variable parameters (e.g., 4 hours at 400 F.) are accessible (e.g., from repository 120*b* and/or external data sources 150) that answer the query even if a response message based on the variable parameters has yet to be generated in a natural language format for a human user.

As alluded to in the previous paragraph, it may be assumed that in many situations and for any number of factors, the query processing system may not have 100% confidence that an available response to a user query will answer that user's questions. Accordingly, for any available response, predetermined or generated, the response module 208 may determine a level of confidence that the available response answers the user query. More precisely, the response module 208 may determine a level of confidence that an available response matches an intent of the user query. The level of confidence may be represented several different ways. For example, the level of confidence may fall within one of several categories (e.g., high, medium, low, etc.) or may be represented numerically, for example, as value on a defined scale. For example, confidence may be ranked on a scale of 0 to 1, with 0.0 to 0.4 indicating low confidence, 0.5 to 0.8 indicating medium confidence, and 0.9 to 1.0 indicating high confidence. As will be described in more detail later, these confidence levels may be used to determine whether to instead turn to a community of other users to answer a particular user's query.

In some embodiments, the process of answering a user query or attempting to answer a user query can be performed using one or more machine learning based models (supervised, unsupervised, or otherwise). Some example machine learning models include decision trees, statistical-based models (e.g., linear regression, logistic regression, etc.), classification models (e.g., Naïve Bayes), neural networks, etc. Machine learning models used to answer user queries may be trained in part based on historical information such as previous queries, responses, and user feedback to such responses. For example, repositories 120*b-c* may include previously received user queries (e.g., in the form of structured data associated with user intents). These previously received user queries or intents may be associated with one or more responses that were determined (e.g. based on user feedback) to answer the user queries (i.e., match the intent). This information may be stored in any relational format such as a relational database, key-value stores, a data graph including nodes connected by edges representing node relationships, etc.

Machine learning based models may be utilized to not only determine an answer to a user's query based on accessible information but also to generate responses in a conversational format that can effectively convey the answer to the user. For example there are a number of different ways to communicate the answer "4 hours at 400 F." to a user. In a simple example, a message based on the text string "4 hours at 400 F." may be output to user, for example, via an audio output or a graphical output. While the response "4 hours at 400 F." may be relatively simple to understand in the context of the user's query it may be unclear in other situations. Instead, in some embodiments, the response module 208 may generate a response in a natural language format based on the information "4 hours at 400 F." For example, the response module 208 may generate an output a message stating, "preheat the oven to 400 degrees Fahrenheit, place your turkey in the oven, and roast for four hours."

If a response is available that answers a user query (e.g., matches the user query above a threshold convince level), the response module may 208 may cause the output of that response to the user 103, for example via any of a computing device 102 and/or an appliance 104. For example, in an embodiment, the response module 208 may retrieve and/or generate a message (e.g., text, audio, image/video, etc.) that answers the user query, and hand off the message to the messaging interface 202 for delivery to the user 103, for example by transmitting the message, via network 110, to a client computing device 103 and/or appliance 104.

As previously alluded to, one or more of the processes described with respect to modules included in the query processing module 122 may be handled by one or more external services 140. For example, in some embodiments processes described above as being performed by the response module 208 depicted in FIG. 2 may instead be performed by one or more external services 140 such as natural language processing services 143 and/or automated dialog services 144. For example, in some embodiments the query processing system 120 may interface with an external chatbot engine hosted on another platform such as Facebook® Messenger.

The crowdsourcing module 212 may enable one or more other users (e.g., users 163a-c) to access and respond to a user query received from user 103 if it is determined (e.g., by response module 208) that a response is not available that answers the user query (i.e., matches the intent of the user query) above a threshold confidence level. For example, in response to receiving an indication from the response module 208 that such an answer is not available. The crowdsourcing module 212 may prompt the user 103 for permission to crowd source an answer. In other words, the crowdsourcing module 212 may prompt the user 103 for permission to enable access to their question to other users (e.g., users 162a-c).

The threshold confidence level at which the query processing system 120 turns to crowdsourcing of answers can vary. For example, the threshold confidence level may be user configurable, user-specific, intent specific, based on historical user feedback, and/or based on any other factors. In an example embodiment, the threshold confidence level may be set at 0.5 when based on a scale of between 0 and 1 (as previously discussed).

In this context, "enabling access" can refer to, for example, delivering the message (or information corresponding to the message) received from the user 103 to the other users 163a-c comprising crowd sources 160 via any one or more communications channels. For example, enabling access to a user query may include posting, by the query processing system 120, the user query to any number of public and/or private forums through which other users 163a-c may access the question.

In some embodiments the one or more crowd sources 160 may include other users 163a-c that may be in communication with the query processing system 120 via any number of public and/or private online platforms. For example, in a public platform such as a public online message board, chat session, news aggregation site, etc., the query processing system 120 may post the user query that is then accessible to any other user 163a-c that visits the public platform. For example, enabling access to the use query via a public platform may include, posting the user query in a public chat session with one or more of the other users (e.g., Facebook® Messenger), posting the query in a public online forum (e.g., Stack Overflow), posting the user query in a public manner via one or more social media platforms (e.g., Facebook, Twitter, etc.), etc.

In some cases public platforms may have sub-groups focused on a particular topic. For example, a particular public platform may have forum specifically directed at cooking. In such cases, enabling access to a given user query may include posting that query in a particular sub-group, for example, based on the content or intent of the user query. For example, a user query regarding cooking time would be more effectively posted in a sub-group focused on cooking than in a general forum.

Enabling access to the user query via a private platform may include, for example, posting the user query in chat session or forum with restricted to particular users and/or transmitting the query as a message for delivery to specific other users 163a-c. For example, a platform like Facebook® that is otherwise public (i.e., accessible to all), may nevertheless have private groups or individual users by which access may be enabled privately. Alternatively, the query may be transmitted for delivery directly to one or more other users 163a-c, for example, via one or more private communication channels (e.g., email, SMS, instant messaging, phone calls, etc.).

In some embodiments the platforms through which other users 163a-c access posted user queries may be managed as part of the query processing system 120. For example, query processing system 120 may host one or more public and/or private forums, chat sessions, etc. through which other users 163a-c may view and respond to posted queries. As with other platforms, this managed platform may include sub-groups, for example, focused on particular topics.

In some embodiment the platforms through which other users 163a-c access posted user queries may be managed by one or more third-party services, for example, Facebook®, Twitter®, etc. In some forums or chat sessions may be set up to interface specifically with the user query platform 120, for example via an API, but may be otherwise managed by the third party.

In some embodiments, the crowdsourcing module 212 may provide an option to a user 103 to select one or more platforms through which to enable access to their user query to other users 163a-c. For example, the option may be presented to the user as a selectable option via a user interface of a client computing device 102. As another example, the option may be presented to the user 103 via a conversational dialog with the user after the user has input their message. As an illustrative example, the query processing system 120 may engage in the following dialog with a user 103 to allow the user to select a particular platform to post their question:

user 103: How long should I roast a twelve pound turkey?
query processing system 120: I'm not sure. Shall we ask the community?
user 103: Sure.
query processing system 120: OK. Any community in particular that you would like to ask?
user 103: Please ask my Facebook friends.

Based on the above interaction, the crowdsourcing module 212 may post the user query to a user's 103 Facebook page/wall that is viewable only to the user's 103 friends, may directly message (e.g., via email, SMS, phone call, etc.) other users identified to be the user's 103 Facebook friends, and/or may initiate a chat dialog, via a platform-specific chat interface such as Facebook Messenger, with the set of other users identified as being the user's 103 Facebook® friends. This is only an example, but serves to illustrate how the set of other users 163a-c that will be granted access to a user's query can be specifically tailored in response to selections by the user 103 submitting the query. Similarly, a user 103 may be presented with other options, for example how to enable access to their query. For example, the a user 103 may be presented with options to link their profile information to the query, make the query anonymous, reword the query, include additional information in the query, set constraints on minimum/maximum number of responses to receive, set timing constraints on receiving responses to the query, etc.

In some embodiments, the platform and/or specific set of other users 163a-c selected for access to the user query may be automatically selected by the crowdsourcing module 212 with little or no input from the user 103. Automatic selections by the crowdsourcing module 212 may be based on a number of factors such as preferences by user 103, interaction history with user 103, the intent associated with the user query, reputations of platforms, groups of other users 163a-c, and/or individual users 163a-c, etc. For example, consider again the user query, "how long should I roast a twelve pound turkey." Based on a determined intent of "cooking time" with associated variable properties such as "whole turkey" and "roast," the crowdsourcing module 212 may automatically select a platform dedicated to cooking (e.g., a baking forum) and/or select the other users 163a-c for particular users with high reputation for baking expertise to enable access to the user query.

As previously alluded to, other users may have associated reputations that indicate overall quality of responses, and/or expertise in particular areas. Such reputational indicators may be managed by the query processing system 120 and/or based on reputations within other platforms or communities. For example, query processing system 120 may tag and track reputation scores for other users based on responses they provide and user 103 feedback to those responses. Alternatively, or in addition, the query processing system 120 may rely on reputational indicators specific to other platforms (e.g., an overall Reddit karma level or karma gained based on comments in a particular "subreddit").

In embodiments, where the query processing system 120 manages reputational indicators for other users 163a-c, the crowdsourcing module 212 may encourage the other users 163a-c to respond to user queries through an incentive-based system where they build a reputation based on quality responses to user queries. Such a system may eventually build a set of "power users" that have high reputational indicators for quality responses, which the crowdsourcing module 212 can then turn to first when seeking an answer to a user query. Other incentives may also be implemented including monetary incentives, certain privileges, etc.

In some embodiments crowdsourcing module 212 may utilize one or more filters through which to process a received user query before enabling access to other users 163a-c. Such filters may be implemented to avoid inappropriate content from being posted publicly. In some cases the filters may restrict the posting to particular other users via private communications channels, may edit objectionable content from the query before posting, and/or may simply block the public posting of the user query. The particular manner in which filters are applied will depend on the requirements of any given implementation of a query processing system.

Responses to the user query may be received from one or more of the other user 163a-c granted access, for example, via the messaging interface 202. One or more of the received responses from other users can then be output to the originally requesting user 103. Specifically, in some embodiments, one or more of the received responses from other users may be forwarded in their originally input format (e.g. text, audio, image/video, etc.) for delivery to the user 103, for example, via any of client computing device 102 and/or an appliance 104.

When the crowdsourcing module 212 enables access to other users 163a-c to the user query, that access to the user query may be linked, tagged, threaded, monitored or in some way tracked so as to allow responses received from the other users 163a-c to be properly associated with the originally submitted user query. The exact mechanism employed will vary depending on the platform through which access is enabled.

In some embodiments, responses to user queries may first be filtered, edited, and/or curated by the crowdsourcing module 212 before outputting to the user. For example, to prevent inappropriate content, the responses from other users 163a-c may be processed using the same or similar filters described previously with respect to filtering of the user query. In some embodiments, the crowdsourcing module 212 may automatically select from a set of received responses for particular responses that best match the intent of the user query and/or are received from other users that have a high reputational indicator.

Timing of responses from other users may present certain challenges. For example, if a user 103 asks a question related to an ongoing activity such as cooking, a response to the question may only have utility to that user 103 if provided within a particular time frame. To address such challenges, the query processing system 120 may take different approaches to outputting responses from other users to the user 103 from which the query was received. For example, in some embodiments responses from other users may be gathered and forwarded to the user 103 by the crowdsourcing module 212 as they come in. In some embodiments, the crowdsourcing module 212 may gather a particular number of responses and/or gather responses for a particular period of time before forwarding to the user 103. In some embodiments if responses are not received from other user within a particular amount of time, the response module 208 may output an available response that best matches the intent of the user query even if the confidence level threshold is not met. A person having ordinary skill will recognize that a number of different approaches to timing of crowdsourced responses may be implemented to meet user requirements.

In some embodiments, the crowdsourcing module 212 may tag responses received from one or more other users 163a-c with information indicative or their origin. For example, an output of a response from another user 163a-c may include an indication that the response is from another user and/or an identification of the particular other user that submitted the response. In some cases the identification may include a name or username of the particular other user, a photo of the other user, an identification of the platform through which the particular other user submitted the response, an indication of the reputation level of the particular other user, etc.

As previously alluded to, one or more of the processes described with respect to modules included in the query processing module 122 may be handled by one or more external services 140. For example, in some embodiments processes described above as being performed by the crowdsourcing module 208 depicted in FIG. 2 may instead be performed by one or more external services 140 such as messaging services 140 or social media services 144. For example, in some embodiments the query processing system 120 may interface with an external social media platform such as Facebook®.

A feedback processing module 214 may prompt the user for feedback regarding supplied responses, receive feedback from the user, and take one or more actions based on the feedback. A goal of receiving feedback can include determining if the user's query has been satisfactorily answered as well as informing internal mechanisms so that the quality of the question-answer process is continually improved.

The feedback processing module 214 may prompt the user for feedback regarding responses provided directly by the query processing system 120, crowdsourced responses provided by one or more other users 163*a-c*, and or responses provided by any other sources. In some embodiments the prompt to input feedback may be included with the delivery of the responses, for example, via any of client computing device 102 or appliance 104. For example, a response output the user 103 as a text-based message (e.g., via a display of a client computing device 102 or appliance 104) may include an option to input feedback regarding the output response.

Feedback may be input by the user 103 a number of different ways. For example, the option may simply include a prompt asking the user 103 if the provided response answers the user's 103 query. Using some type of interface mechanism (e.g. a button, toggle, etc.), the user 103 may indicate yes or no to the prompt. If the user 103 indicates that the output response does not answer their query, the feedback processing module 214 may further prompt the user 103 for further feedback, for example clarification on why the response does not answer the query, additional details that may be input to better define the query, an indication of how close the response was (e.g., via a sliding scale or some other variable input mechanism), or any other information that may better illuminate the provided feedback.

In some cases, the option to input feedback may be integrated into the ongoing dialog between the query processing system 120 and the user 103. For example after causing the output of an audio or text-based message including a response, the query processing system 120 may cause the output of a follow up audio or text-based message such as, "did that answer your question?"

As mentioned, in some situations, multiple responses supplied by other users 163*a-c* may be output to the user 103 as part of a crowdsourcing process. In such situations, the feedback processing module 214 may prompt the user to select one or more particular responses of the multiple responses that best answer the user query. User selection may be made by any of the interface mechanisms described above.

In some embodiments, the feedback processing module 214 may automatically take certain actions based on received feedback to improve overall quality of service provided to users 103. For example, in some embodiments, using received feedback, the feedback processing module 214 may train one or more of the machine learning models used to, interpret messages, determine intent of user queries, and or arrive at responses based on user queries. The training of machine learning models can be based on both responses that did not answer the query (according to the feedback) as well as responses that did answer the query (according to the feedback). In some embodiments queries and/or responses (or data associated with such) may be immediately trained into the machine learning models and/or provisionally supplied to mechanisms associated with the machine learning models. For example, the query/response and/or associated feedback may be supplied to one or more handlers of a chatbot engine.

In some embodiments, this process of training internal mechanisms to improve overall quality of service may include storing the input queries and one or more responses (internally generated and/or crowdsourced) in a repository such as repository 120*b*. Note this can include storing the responses in their original format and/or metadata associated with the responses. In some embodiments, the query/response(s) may be associated with each other and other similar queries (e.g., previously received queries) so that when similar queries are received in the future, the response(s) associated with the similar query can be readily retrieved and output.

In some embodiments, the external services interface 216 may allow for communications between any one or more processes executing as part of the query processing module one or more external services, for example any of the external services 140 described with respect to FIG. 1. In some embodiments, the external services interface 216 may represent one or more application program interfaces (APIs) through which the one or more external services communicate with and/or integrate with the query processing system 120.

Example Question and Answer Process

Figure 3A:
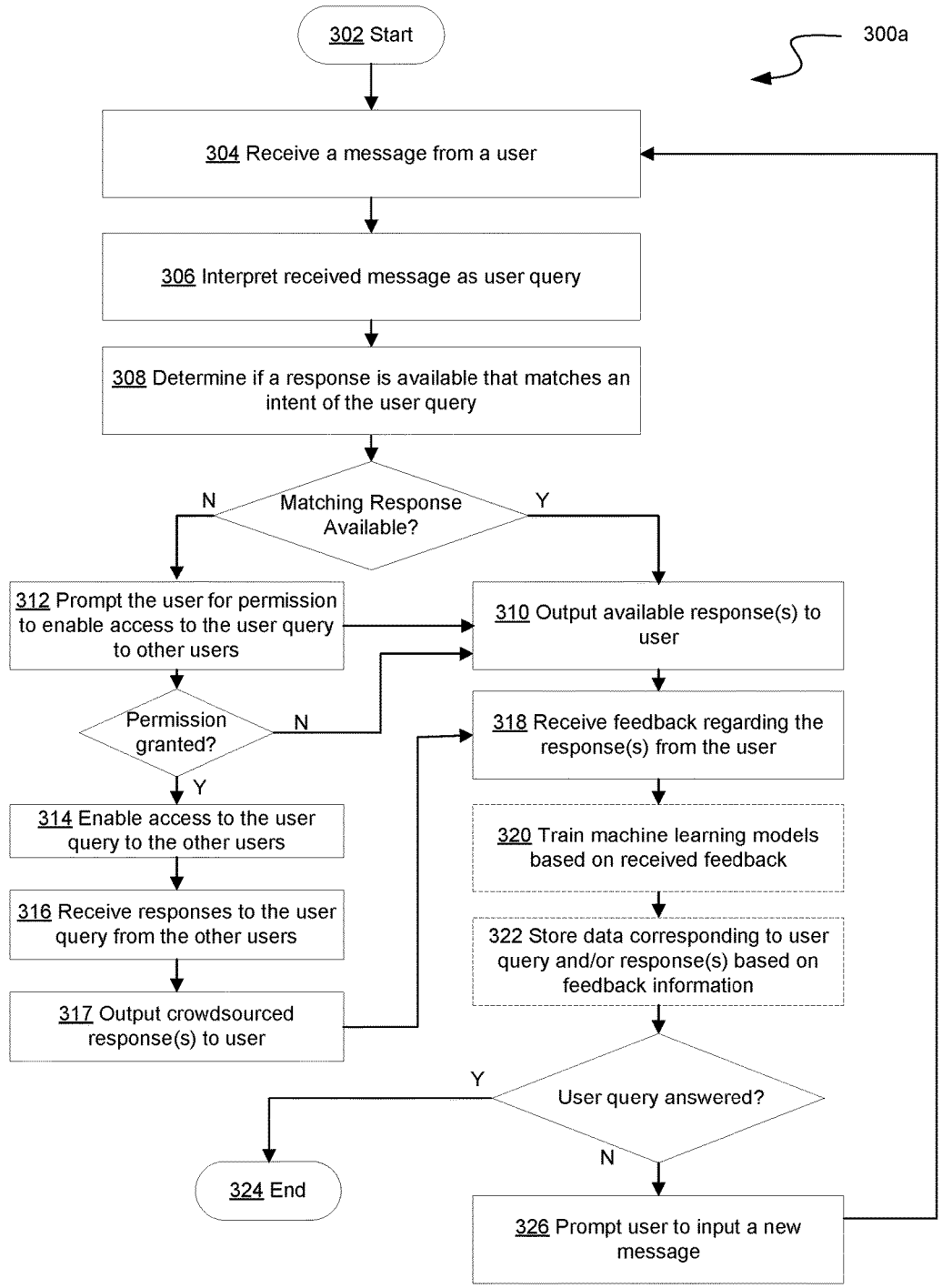
FIG. 3A is a flow diagram illustrating an example process for outputting answers to user queries.

FIG. 3A shows a flow diagram illustrating an example process 300*a* for outputting answers to user questions, for example as performed by any one or more of the devices or systems described with respect to FIG. 1 or 4A-4C. For explanatory purposes, certain aspects of the example process may be described with respect to the query processing system 120 of FIG. 1, however as explained later, aspects of this system may in some cases be integrated in a system concerned with food preparation such as the FPG system 420 of FIG. 4A-4C. In some embodiments, the example process 300*a* may be, but are not necessarily, carried out by the execution, by a processing unit, of instructions associated with a query processing module 122 or 422. The "processing unit" in this context may be part of any one or more of the devices or systems described with respect to FIG. 1 or 4A-4C.

The example process 300*a* starts at 302. For example, the process 300*a* may start in response to an opening of a specific application or selection of an icon displayed on a display of a computing device. In response, the processing unit may cause a display or presentation of a splash screen or introduction screen.

At 304, the processing unit may receive a message from a user 103. For example, the processing unit may receive, via a communication network 110, a message input via a user-operated client computing device 102 and/or appliance 104. As previously discussed, this message may be received in any format including text-based, audio-based, and/or image/video-based.

At 306, the processing unit may interpret the received message as a user query. For example, in some embodiments, using natural language processing (as described with respect to intent recognition module 204), the processing unit may parse the received message into a string of words that are then analyzed (e.g., using machine learning models) to determine an intent of the received message and in some cases one or more variable properties associated with the intent. The intent in some cases may be indicate that the received message is a question by the user 103 (i.e., a user query). As previously described with respect to the intent recognition module 204, in some embodiments, the received message may be converted from a received format to a converted format before parsing, for example where messages are received as audio and/or images/video.

At 308, the processing unit may determine if a response is available that answers the user query. More specifically, the processing unit may determine if a response is available that matches an intent of the user query above a threshold level of confidence. As described with respect to the response module 206, determining if a response is "available" may include determining if at least one of a plurality of stored predetermined responses are accessible that match the intent of the user query above the threshold confidence level. This is generally referred to as a retrieval based model. However, in other embodiments, determining if a response is "available" may include determining if a response can be generated that matches the intent of the user query above the threshold confidence level. In other words, determining if a response is "available" may include determining if requisite data is accessible to answer the user's query even if response has not yet been generated. This is generally referred to as generative model. In some embodiments a hybrid approach may be taken in which pre-generated response templates (e.g. text based, audio based, image/video based, etc.) are utilized to generate responses that match the intent of a user query based on various variable properties of the intent of the user query. Again, all of this process this processing may, in some embodiments, be performed using one or more machine learning models.

If at step 308, a response is determined to be available that matches the intent of the user query above a threshold confidence level, at step 310 the processing unit may output the response to the user 103. For example, as previously described, responses may be output to a user 103 via any of a client computing device 102 and/or an appliance 104. For example, in some embodiments the processing unit may cause the client computing device 102 and/or appliance 104 to output the response (e.g. via an associated display, speakers, or some other output mechanism). This may, in some embodiments, include retrieving and/or generate a message (e.g., text, audio, image/video, etc.) that answers the user query, and transmitting the message, via networks 110, for delivery to the user 103, via the client computing device 103 and/or appliance 104.

Figure 3B:
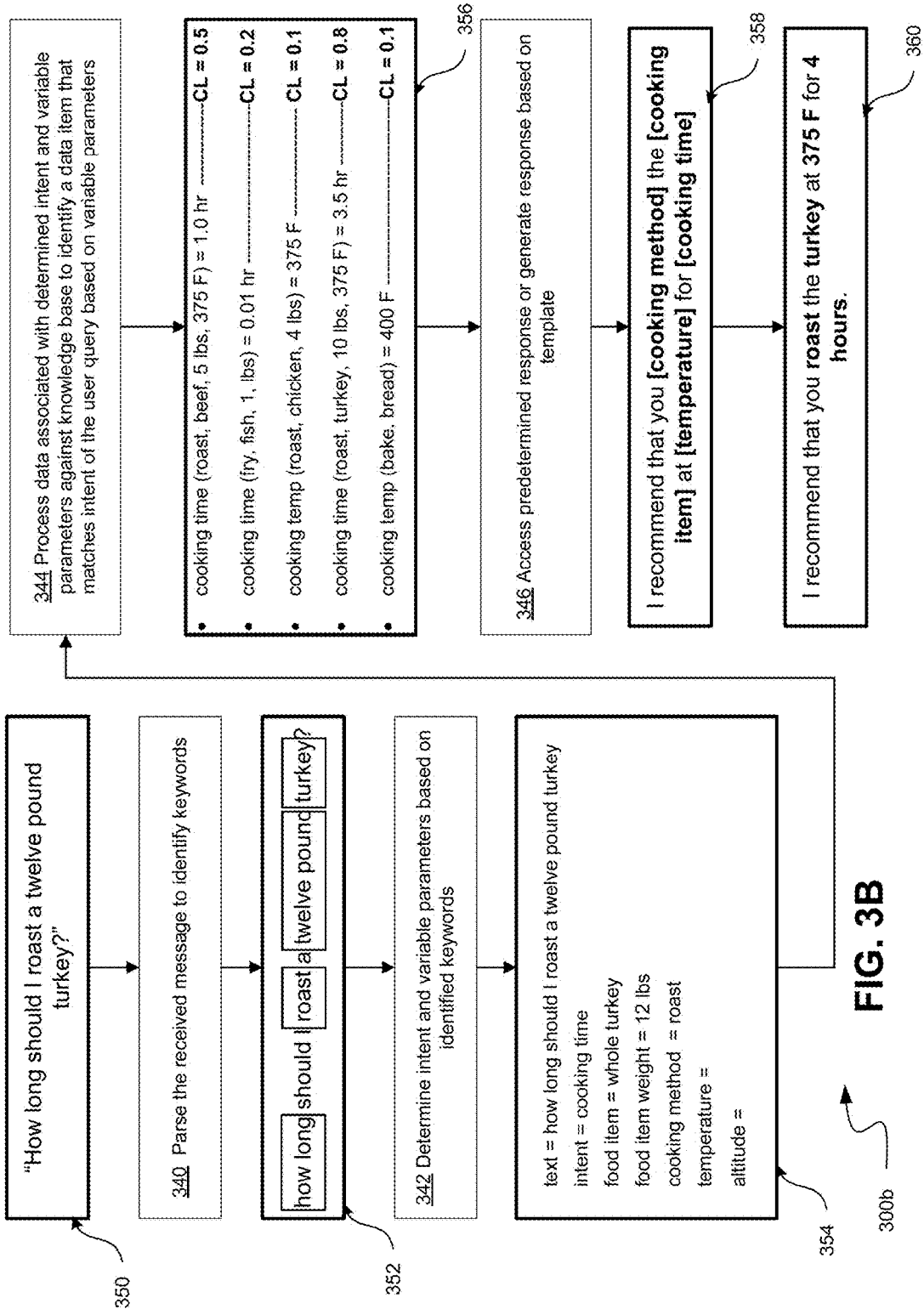
FIG. 3B is a flow diagram that describes an example process for receiving a user query and determining if an answer is available that matches an intent of the user query.

FIG. 3B is a flow diagram that describes an example process 300b for receiving a user query and determining if an answer is available that matches an intent of the user query, for example, similar to as described with respect to steps 304-308 in FIG. 3A. For illustrative purposes, consider again a message 350 from a user 103 stating, "how long should I roast a twelve pound turkey?" At step 340, the text of the received message is parsed to identify one or more keywords. For example, as shown at element 352, the received message has been parsed to identify certain keywords or key combinations of words such as, "how long," "roast," "twelve pound," and "turkey."

Next at step 342, the an intent, along with one or more variable parameters, is determined based on the identified keywords. In some embodiments, the intent and variable parameters are output as a structured data item, for example as represented by element 354.

The process continues at step 344 with processing this structured data item 352 with other data in a knowledge base (e.g., stored in repository 120b and/or external data sources 150) to determine if an answer to the user query is available. Specifically, in some embodiments this may involve comparing the structured data 354 resulting from the message 350 to stored data items to look for matches. For example, element 356 represents an example listing of data items, each representing an intent with an associated set of variable parameters, and an answer associated with the intent. This may represent one technique for storing question/answer combinations, but is not to be construed as limiting. For example, the question, "how long do I roast a five pound piece of beef at 375° F.?" and an associated answer of "1 hour" may be represented, as shown at element 356, as "cooking time (roast, beef, 5 lbs., 375° F.)=1.0 hr" wherein "cooking time" is the intent with a set of variable parameters and is set to equate to a particular answer. Note that the data represented at element 356 may be the result of historical question and answer processes performed by the query processing system 120, including the crowd-sourcing of responses and user feedback to such responses.

Given a set of these data items, the process 300b, can compare the structured data 352 to determine a data item that matches above a certain confidence level. For example, each of the listed data items in element 356 are associated with a listed confidence level value ("CL") based on the processing of the structured data of element 354 at step 344. As shown, the item with the highest confidence level (0.8) is "cooking time (roast, turkey, 10 lbs., 375° F.)=3.5 hrs." In other words, based on the data in the knowledge base, the processing system has identified a unit of knowledge that indicates that it takes 3.5 hours to roast a 10 lb. turkey at 375° F. Note that this is not an exact answer given the differences in certain variable parameters. For example, the available cooking time is for a 10 lb. turkey instead of a 12 lb. turkey and is for an oven temperature of 375° F. whereas the user's question did not specify an oven temperature. Nevertheless, based on the processing at step 344, the question/answer combination may be determined to match with a 0.8 confidence level, which may be close enough if above the set threshold.

Assuming that an answer is available that matches the intent of the user query above a threshold confidence level, the process 300b continues at step 346 with accessing a predetermined response associated with the data item or generating a response, for example based on a template. In an embodiment, a text of a predetermined response may be linked to the data item representing the question/answer combination. For example, the data item, "cooking time (roast, turkey, 10 lbs., 375° F.)=3.5 hr" may be linked with the text of a question and/or answer corresponding to the data item. For example, the text of a stored response for the aforementioned data item may read, "I recommend that you cook the turkey at 375° F. for 3 hours and 30 minutes." If there is an exact match, the system may simply output this as a response to the user 103. However, a response may also be generated that is specific to the intent of the user query. For example, as shown at element 358, a template response may be associated with the queries having a "cooking time" intent. The variables associated with the template responses such as, "cooking method," "cooking item," "temperature," and "cooking time" can then be filled in with predetermined or inferred values to formulate a response to output to the user 103, for example as shown at element 360. Note that in some cases, the system may infer values for certain variables to tailor the response to the user's 103 query. For example, as shown at element 360, the value for the cooking time has been extrapolated from 3.5 hours for a 10 lb. turkey to 4 hours for a 12 lb. turkey. This extrapolated value may, for example, be based on a statistical analysis of a subset of the knowledge base, an established algorithm relating weight to cooking time, or any other appropriate method.

Returning to FIG. 3A, if at step 308, it is determined that a response is not available that matches the intent of the user query above a threshold confidence level, at step 312 the processing unit may prompt the user 103 for permission to enable access to the user query to one or more other users 163a-c. As previously described, prompting the user 103 for permission may include causing the client computing device 102 and/or appliance 104 to output a prompt message (e.g. via an associated display, speakers, or some other output mechanism). Specifically, this may include retrieving and/or generating a prompt message (e.g., text, audio, image/video, etc.), and transmitting the prompt message, via networks 110, for delivery to the user 103, via the client computing device 103 and/or appliance 104.

As previously alluded, certain scenarios may have strict timing requirements. For example, if a user is grilling a steak and asks, "how long do I grill a steak," they may need an answer as soon as possible even if that answer is not completely accurate. Accordingly, as suggested by the arrows in the flowchart depicted in FIG. 3A, in some embodiments an available response (predetermined or generated), may at step 310 be output to the user 103 in parallel (or at least close temporal proximity) with the prompting for permission at step 312 even if the available response does not match the intent of the query above the threshold confidence level. The output message could, could for example, be corresponding with a highest relative level of confidence (i.e., relative to other available responses) even if that relatively high level of confidence does not meet the requisite confidence threshold. Consider again the user query, "how long do I grill a steak." If a response is not available that matches the intent above the threshold confidence level, the processing unit may at step 310 output a provisional response (i.e., having the highest relative confidence level) to the user 103 while at the same time prompting the user 103 to enable access to the query to other users 163a-c. For example, the processing unit may cause a client computing device to output the following message, "Sorry, I may need some information, but you can try 3 minutes on each side. In the meantime would you like to submit this question to the community?"

After prompting the user 103 for permission at step 312, the processing unit may receive an indication (e.g., in the form of a message) either granting or denying permission. If the user 103 denies permission to enable access to the user query to other users 163a-c, several different paths may be taken. In some embodiments, the processing unit may at step 310 cause the output of an available response to the user 103 even if that available response does not match the intent of the user query above the threshold level of confidence, as depicted in the flow chart of FIG. 3A. Alternatively, in some embodiments, if the user 103 denies permission, the process 300a may simply end at step 324 (not depicted in FIG. 3A). Alternatively, in some embodiments, if the user 103 denies permission, the processing unit may at step 326 prompt the user 103 to input a new message, for example to rephrase their question (not depicted in FIG. 3A). This path would essentially restart process 300a upon receipt at step 304 of a new message from the user 103.

If the user 103 grants permission to enable access to the user query to other users 163a-c, then at step 314 the processing unit may will enable access to the user query to those other users 163a-c. As previously described, "enabling access" can refer to, for example, delivering the message including the user query (or information corresponding to the message) received from the user 103 to the other users 163a-c via any one or more communications channels. For example, enabling access to the use query can include, posting the user query in a chat session with one or more of the other users (e.g., Facebook® Messenger), posting the query in an online forum (e.g., Stack Overflow), posting the user query via one or more social media platforms (e.g., Facebook, Twitter, etc.), and/or directly transmitting the user query to client computing devices 162a-c associated with the one or more other users 163a-c via one or more private communication channels (e.g., email, SMS, instant messaging, phone calls, etc.). Additional processes that may be performed at this step, for example prompting the user 103 for particular platforms through which to enable access, are described in more detail with respect to the crowdsourcing module 212 of FIG. 2.

At step 316, the processing unit may receive one or more responses to the user query from the other users 163a-c. For example, the processing unit may receive, via a communication network 110, messages input via one or more client computing devices 162a-c associated with the one or more other users 163a-c. As previously discussed, these messages may be received in any format including text, audio, and/or image/video.

After receiving responses from the one or more other users 163a-c, the processing unit may at step 317 output the received one or more responses to the user 103. For example, as previously described, responses may be output to a user 103 via any of a client computing device 102 and/or an appliance 104. In some embodiments, the processing unit may cause the client computing device 102 and/or appliance 104 to output the one or more responses (e.g. via an associated display, speakers, or some other output mechanism). This may, in some embodiments, include translating or otherwise modifying one or more of the received responses, and transmitting the one or more received responses as messages, via networks 110, for delivery to the user 103, via the client computing device 103 and/or appliance 104. Additional processes that may be performed at this step, for example filtering or selecting from the received one or more responses, are described in more detail with respect to the crowdsourcing module 212 of FIG. 2.

Responses output to the user 103 may in some embodiments include or be followed up with a prompt to the user 103 to input feedback regarding the output one or more responses. This may apply to both responses retrieved and/or generated by the query processing system 120 and crowdsourced responses input by the other users 163a-c. As previously discussed, the prompt to input feedback may be included with the delivery of the response(s), for example, via any of client computing device 102 or appliance 104. For example, a response output the user 103 as a text-based message (e.g., via a display of a client computing device 102 or appliance 104) may include an option to input feedback regarding the output response.

In response to the prompt, at step 318, the processing unit may receive the input feedback regarding the responses form the user 103. The received feedback may be based on inputs at any of client computing device 102 and/or appliance 104 and may be received via network 110. As previously discussed, feedback may be input by the user 103 in a number of different ways. For example, the option may simply include a prompt asking the user 103 if the provided response answers the user's 103 query. Using some type of interface mechanism (e.g. a button, toggle, etc.), the user 103 may indicate yes or no to the prompt. Additional details on how feedback may solicited and received are described with respect to the feedback processing module 214 of FIG. 2.

In response to receiving the feedback from the user 103, the processing unit may automatically perform certain actions based on the feedback, for example to improve overall quality of service provided to users 103. For example, in some embodiments, the processing unit may optionally at step 320 train machine learning modules based on the feedback. The training of machine learning models can be based on both responses that did not answer the query (according to the feedback) as well as responses that did answer the query (according to the feedback). Further, in some embodiments, the processing unit may at step 322 store data corresponding to the user query and/or the retrieved, generated, and/or received responses based on the feedback. For example, as described with respect to the feedback processing module 214 of FIG. 2, In some embodiments, this process of training internal mechanisms to improve overall quality of service may include storing data corresponding to the input queries and one or more responses (internally generated and/or crowd-sourced) in a repository such as repository 120*b*. Note this can include storing the responses in their original format and/or metadata associated with the responses. In some embodiments, the query/response(s) may be associated with each other and other similar queries (e.g., previously received queries) so that when similar queries are received in the future, the response(s) associated with the similar query can be readily retrieved and output.

If the processing unit receives feedback from the user 103 indicating that an output response has satisfactorily answered their query, then at step 324 process 300*a* may conclude.

If however, the processing unit receives feedback from the user 103 indicating that an output response has not satisfactorily answered their query, then at step 326 the processing unit may prompt the user to input a new message, for example to rephrase their original query or provide additional information. If, in response to this new prompt, the processing unit receives a new message from the user, the process 300*a* may restart to provide a response to the new message.

Figure 3C:
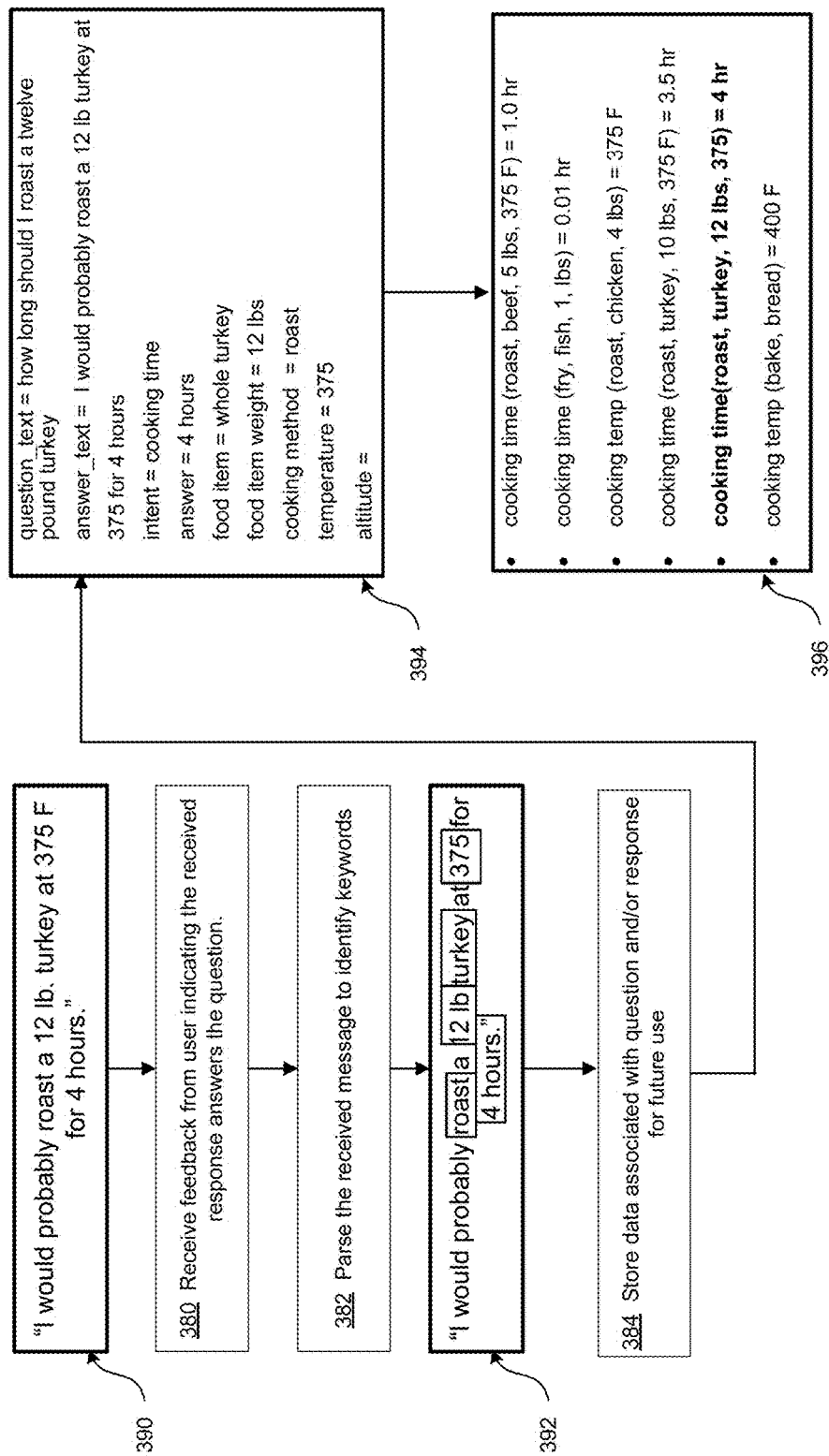
FIG. 3C is a flow diagram that describes an example process for storing data associated with a crowd-sourced response.

FIG. 3C is a flow diagram that describes an example process 300*c* for storing data associated with a received response from another user, for example similar to as described with respect to steps 320 and 322 in FIG. 3A. For illustrative purposes, consider again a message 350 from a user 103 stating," how long should I roast a twelve pound turkey?" described with respect to FIG. 3B. Also, assume that unlike the scenario described in FIG. 3B, here the system has determined that the a response is not available that matches the intent of the user query above a threshold confidence level and has enabled access to the user query to other users 163*a-c*. The system may then receive a response message 390 from one of the other users 163*a-c*. Here, the response 390 from the other user reads, "I would probably roast a 12 lb. turkey at 375° F. for 4 hours." At step 380, feedback is received from the user indicating that this received response from the other user answers the question. Accordingly, at step 382, the text of the received message is parsed to identify one or more keywords. For example, as shown at element 392, the received response has been parsed to identify certain keywords or combinations of words such as "roast," "12 lb.," "turkey," and "4 hours." At step 384, data associated with the original question from user 103 and the received response from other user 163*a-c* is used to train one or more machine learning models and/or stored for future use. For example, element 394 shows an example set of structured data that may represent the particular question/answer combination. Similarly, element 396 shows the integration of a data item representing the particular question/answer combination with other data items in a knowledge base. Note, as with element 356 in FIG. 3B, the representation of data items in element 396 is exemplary provided for illustrative purposes. The stored data may utilize any appropriate data structure depending on the particulars of the given implementation.

The example processes 3 described above with respect to FIGS. 3A-3C are provided for illustrative purposes and are not to be construed as limiting. In other embodiments, processes may include fewer or more steps than as shown in FIGS. 3A-3C, may include different steps than as shown in FIGS. 3A-3C, and/or may order the steps differently than as shown in FIGS. 3A-3C.

Integration with a Food Preparation Guidance System

Figure 4A:
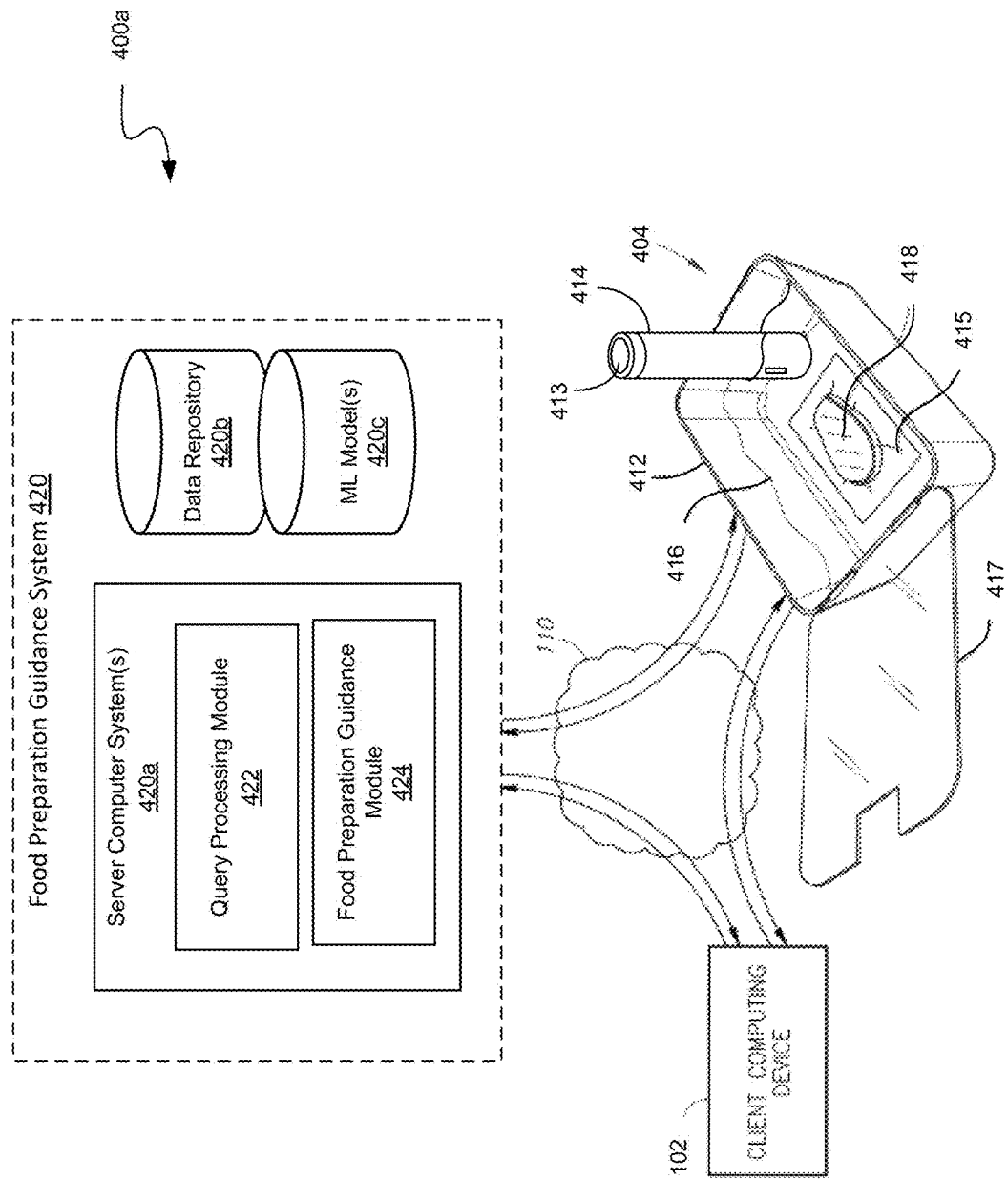
FIG. 4A is a schematic view of a first example networked environment in which a food preparation guidance system with integrated query response functionality system may be implemented.

In some embodiments aspects of a query processing system similar to the query processing system 120 described with respect to FIG. 1 may be integrated with or otherwise associated with other computing platforms. For example, the previously described techniques for processing user queries may be applied to a computing system configured to provide customized food preparation instruction, guidance and/or control. FIG. 4A shows an example networked environment 400 for use in providing customized food preparation instruction, guidance and/or control that may include such features. As shown in FIG. 4A, the networked environment 400 may include one or more client computing devices 102, a cooking appliance 404, and a food preparation guidance ("FPG") system 420 communicatively coupled together via one or more communications channels, for instance communications networks 110 (e.g., LAN, WAN, Internet, Worldwide Web, cellular network, USB®, Bluetooth®, WIFI®, NFC).

Similar to the query processing system 120 described with respect to FIG. 1, FPG system 420 may take the form of one or more server computer systems 420*a* with associated non-transitory processor-readable storage media or data store 420*b-c*. Notably, FPG system 420 depicted in FIG. 4A includes a query processing module 422 (e.g., similar to the query processing module 122 described with respect to FIGS. 1-2) as well as a food preparation guidance module 424.

Although depicted in FIG. 4A as being part of server computing systems 420*a*, the query processing module 422 and food preparation guidance module 424 may include any combination of hardware and/or software for executing instructions to carry out the functionalities described herein. Specifically, the query processing module 422 may handle one or aspects of the previously described processes for responding to user queries and the food preparation guidance module 424 may handle processes for controlling the cooking of food using cooking appliance 104 (described in more detail below). Modules 422 and 424 may be implemented as software instantiated in a computer-readable medium or computer-readable storage medium (e.g., a storage medium internal to server computer systems 420*a* or external to servers 420*a* such as repository 420*b*) on a machine, in firmware, in hardware, in a combination thereof, or in any applicable known or convenient device or system. This and other modules, submodules, or engines described in this specification are intended to include any machine, manufacture, or composition of matter capable of carrying out at least some of the functionality described implicitly, explicitly, or inherently in this specification, and/or carrying out equivalent functionality. Further, while modules 422 and 424 are depicted in FIG. 4A as a two separate modules, in some embodiments, their associated functionalities can be carried out by or in conjunction more or fewer modules than as shown in FIG. 4A.

While illustrated as a single server computer system 420*a* and associated non-transitory storage media 420*b-c*, many implementations may employ two or more server computer system 420*a* and/or non-transitory associated processor- or computer-readable storage media 420*b-c*. In some implementations or instances, the non-transitory processor- or computer-readable media 420b-c may include a database or other data structure which stores one or more of: image data, video data, audio data, cooking simulation models, lookup tables, food preparation algorithms, customer identifiers, customer account identifiers, customer identity information, financial account information (e.g., credit and/or debit account numbers, expiration dates, security codes), customer cooking history, data captured during cooking processes, and/or other data or statistics.

Additional aspects of a computing environment in which a query processing system similar to query processing system 120 may be implemented are not depicted in FIG. 4A for the sake of clarity. However, it shall be appreciated that the FPG system 420 depicted in FIG. 4A may be implemented in a computing environment that includes one or more of the components of networked environment 100 described with respect to FIG. 1, namely one or more external services 140, external data sources 150, and crowd sources 160.

In the illustrated implementation, the cooking appliance 404 takes the form of a sous vide cooker that includes a vessel or container 412 and a thermal immersion circulator 414 coupled to, for instance, an edge of the container. The cooking appliance 404 depicted in FIG. 4A may corresponding the appliance 104 depicted in FIG. 1. Accordingly, any description of appliance 104 will may similarly apply to cooking appliance 404. In some implementations, the cooking appliance 404 may be other types of cooking appliances, such as an oven, induction cooker, etc. The container 412 holds a quantity (e.g., 10 liters) of liquid 416 (e.g., water) that may be heated and circulated using the thermal immersion circulator 414. In addition to liquid, other fluids (e.g., air, oil) may alternatively or additionally be used. Further, in some implementations the container 412 may be insulated and/or may have a selectively removable cover or lid 417. In the illustrated example, a food product 418 is placed inside a vacuum-sealed plastic bag or pouch 415 which is immersed in the liquid bath 416. In some implementations, the food product 418 may be placed inside of a re-sealable plastic bag or jar. The food product 418 may be any of a number of different types of food products, such as meats, eggs or vegetables. Some food products, such as eggs, may be placed directly in the liquid bath 416 without use of the plastic bag 415. Further, in instances where the cooking appliance utilizes a non-liquid fluid (e.g., air), the food product may be placed inside the vessel or cooking chamber without use of a container that separates the food product from the fluid.

Figure 9:
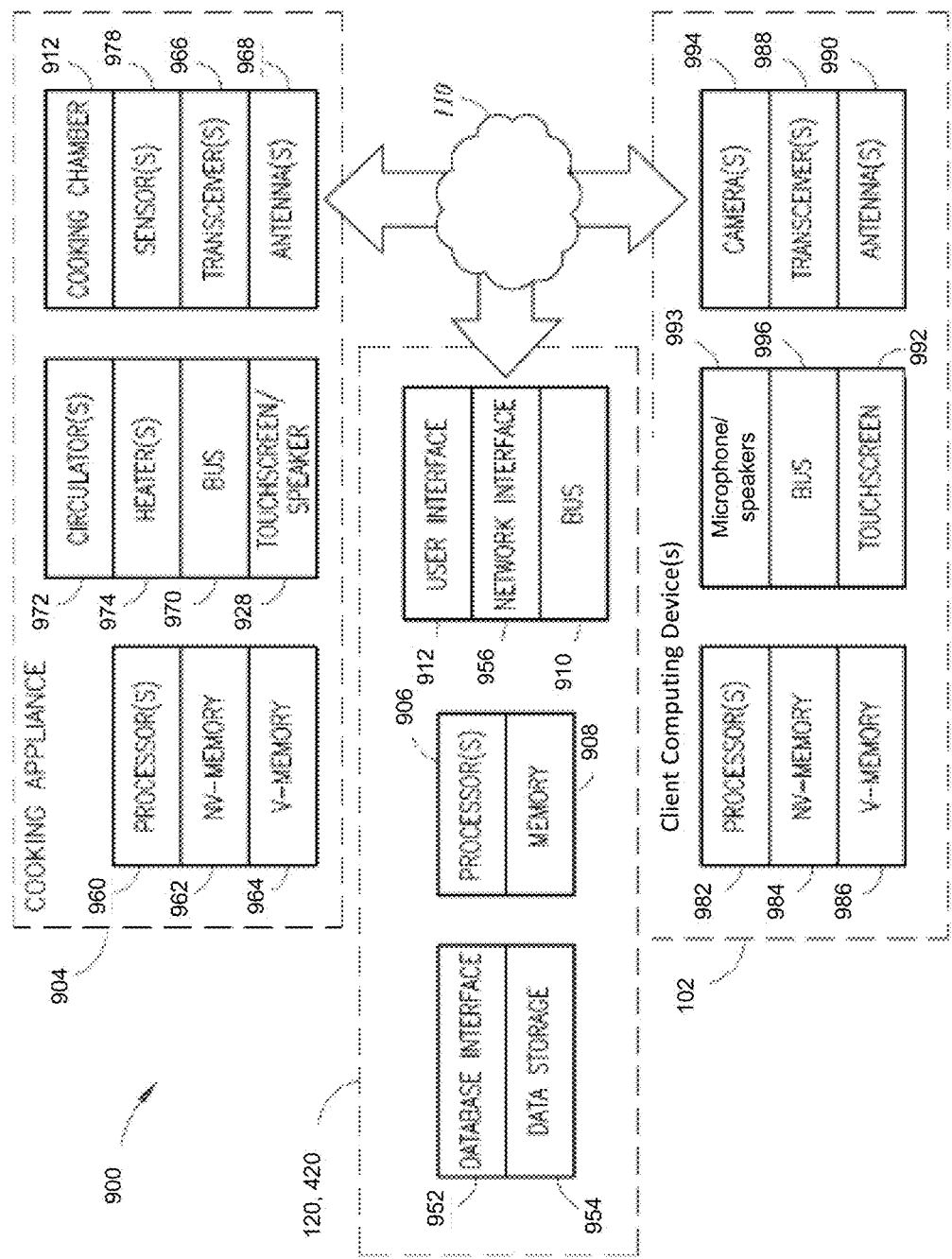
FIG. 9 is a block diagram illustrating particular functional components of the query processing system of FIG. 1 and/or the food preparation guidance system of FIGS. 4A-4C.

The thermal immersion circulator 414 may be an electrically powered device that circulates and heats the liquid bath 416 at an accurate and stable temperature. The thermal immersion circulator 414 may include a circulator pump 672 (FIG. 9) to move the liquid in the liquid bath 416 and a heating element 674 (FIG. 9) immersed in the liquid to heat the liquid. The thermal immersion circulator 114 may also include a probe or sensor 678 (FIG. 9), for example, a temperature sensor to sense the temperature of the liquid bath 416 and control circuitry which compares the temperature measured by the temperature probe with a desired temperature value and supplies power to the heating element as required to control the temperature of the liquid bath. Various components of the cooking appliance 404 are shown in FIG. 9. The control circuitry may control the temperature of the liquid bath 416 so that the food product 418 may be cooked according to particular cooking instructions or a determined cooking program. For example, in the case where the food product 418 is a one-inch thick rib-eye steak, the control circuitry may be programmed to heat the liquid bath 416 to a temperature of 56° C., whereas the control circuitry may be programmed to heat the liquid bath to a temperature of 90° C. to cook root vegetables.

The thermal immersion circulator 414 may include a user interface 413 that includes one or more inputs (e.g., buttons, touch screen, microphone) and one or more outputs (e.g., screen, LED(s), speaker(s)). The user may interact with the user interface 413 to select one or more cooking programs, select one or more temperature settings or select one or more cooking durations. As discussed below, in some implementations the user interface 413 may provide information to the user relating to the current status or estimated future status for a cooking process. In some implementations, the thermal immersion circulator 414 may not include a user interface and the user may interact with a user interface integrated into the cooking appliance 404 or an interface of another device (e.g., a computing device 102 communicatively coupled to the cooking appliance 404 and/or the circulator 414).

In some implementations, the control circuitry may utilize a proportional-integral-derivative ("PID") control scheme to accurately control the temperature of the liquid bath 416 according to a determined cooking program or process. A PID controller calculates an error value as the difference between a measured temperature and a desired set point. The PID controller attempts to minimize the error by adjusting the temperature through use of the controllable heating element 674 (FIG. 9). Generally, the PID controller algorithm involves three separate constant parameters (e.g., "P", "I", "D"). These parameters may be interpreted in terms of time: P depends on the present temperature error, I depends on the accumulation of past temperature errors, and D is an estimation of future temperature errors based on current rate of change. The weighted sum of these three actions may be used to adjust the temperature control for the cooking process via controlling the power supplied to the controllable heating element 674 (FIG. 9). In some implementations, other control algorithms may be used, such as PI control, PD control, P control, I control or other linear or nonlinear control schemes.

In some implementations, a user may utilize the client computing device 102 to interact with the cooking appliance 404. For example, the client computing device 102 may execute a program or "app" that provides at least one of instructions or data to the cooking appliance 104 and receives information from the cooking appliance via a suitable communications interface (e.g., Bluetooth®, USB®, WIFI®).

Additionally, a user may use the client computing device 102 to experience (e.g., view, listen) one or more audio/image/video ("media") depictions of a prepared food product. The one or more media depictions may present audio or visual depictions of the prepared food product at various gradations or variants of an ending characteristic, such as texture, consistency or doneness. The media depictions allow the user to simply select a preferred gradation for one or more characteristics of a cooked food product, such as the texture or consistency of an egg yolk, the texture or consistency of an egg white, or the texture or consistency of a steak based on visual image, pictorial or video representations of the food product at a variety of different gradations.

The user may utilize the client computing device 102 to send one or more input parameters such as ending preferences or starting conditions to the food preparation guidance (FPG) system 420 via one or more communications channels such as the communications networks 110. In response, the FPG system 420 may send output food preparation parameters or output cooking parameters (e.g., time, temperature, pressure, speed, etc.) to the cooking appliance 404 over communications networks 110 to autonomously control the cooking appliance. The FPG system 420 may communicate directly with the cooking appliance 404 via the communications networks 110 or may communicate with the cooking appliance indirectly via the client computing device 102. In some implementations, the user may view the output cooking parameters or program on a display of the client computing device 102 or the cooking appliance 404. The cooking appliance 404 may then prepare the food product 418 according to the received food preparation parameters or program. Although the term "cooking" is used herein, it should be appreciated that the present implementations may also be applied to food preparation that does not necessarily require heat, such as preparing a puree, ice cream, smoothie, dough, or other food products.

In implementations where the cooking appliance 404 implements sous vide cooking, the cooking appliance may measure the temperature of the liquid bath 416 and measure or estimate the amount of heat transferred to the liquid. For implementations where the cooking appliance 404 is of another type, the cooking appliance may measure the surface temperature of the food product 418 using a suitable sensor and measure or estimate the amount of heat that is absorbed by the food product. In some implementations, the cooking appliance 404 measures the surface temperature of the food product 418 and measures one or more interior temperatures of the food product.

The cooking appliance 404 collects and stores some or all of the aforementioned data at fixed or variable time intervals. This collection of data forms a collection of time-series data that may be processed to provide updates to a cooking program and/or to provide cooking projections presentable to a user through a user interface, such as a display of the client computing device 102 or a display of the cooking appliance 404.

As discussed above, the client computing device 102 is operative to communicate with the FPG system 420 and the cooking appliance 404 via the communication networks 110. The client computing device 102 may allow a user to select an end result for the food product 418 which the user is cooking via the user interface. For example, the user may select an image displayed on a display of the user interface of the client computing device 102 that corresponds to a desired doneness of meat. As another example, the user may select a video that depicts a desired texture for a custard.

The client computing device 102 may also allow the user to provide information indicating what food product(s) the user plans to prepare. For example, the user may provide or select a recipe for a food product. The amount of detail provided by the user may alter how the food product is prepared by the cooking appliance 404. For example, simply indicating a food product as a steak may generate a different cooking program than indicating a food product is four prime-grade, two centimeters thick, top-loin steaks that weigh 1.3 kilograms.

As an example, the user may input any or all of the following relating to a food product to be prepared: the species and/or muscles of cuts of meat, fish or poultry; one or more ingredients in the plastic pouch, the initial temperature of the food product; the volume or mass of the food product; the surface area of the food product; or how the raw food product was prepared (e.g., brined, dry-aged, marinated, cured, blended, ground, molded). The user may also input the shape of the food product, such as its characteristic length or width, or a description of the food product (e.g., "slab-like," "large egg"). In some implementations, the user may input or select one or more photographs or videos of the food product which may be usable by the client computing device 102, FPG system 420, and/or cooking appliance 404 to generate a cooking program for preparing the food product 418.

In some implementations, the user may select a recipe that provides information usable by the client computing device 102, the FPG system 420, and/or cooking appliance 404 to generate a cooking program for preparing the food product 418. For example, the user may select a recipe on a Web site which automatically provides details to the computing device 102, the FPG system 420, and/or cooking appliance 404 about the food product to be prepared upon selection of the recipe. In some implementations, the user may be able to modify the selected recipe to suit the user's particular preferences.

The cooking appliance 404 may transmit various data or information to the client computing device 102 and/or to the FPG system 420. For example, the cooking appliance 404 may from time-to-time transmit a subset or all of the collected time-series measurement data to the client computing device 102 or to the FPG system 420. In some implementations, the cooking appliance 104 may transmit only a subset of the collected time-series data that includes the most recent measurement or the measurements obtained since the previous successful transmission of the measurement data to the client computing device 102.

The cooking appliance 404 may also transmit information about the present state of the cooking appliance and/or one or more previous states of the cooking appliance. Such information may include whether the cooking appliance 404 is powered on or in a standby mode, current and previous set-point temperatures, or any manually adjusted parameters of the cooking appliance, such as a manually selectable temperature set-point. The cooking appliance 404 may also transmit information about non-standard operating conditions, such as power interruptions or a low liquid level for the liquid bath 416. The cooking appliance 404 may also transmit system parameters, such as control parameter settings, firmware version, memory usage, sample rate, etc. The cooking appliance 404 may also transmit information or data received from the FPG system 420 to the client computing device 102, or vice versa.

The client computing device 102 may transmit various data or information to the cooking appliance 404 and/or to the FPG system 420. For example, the client computing device 102 may transmit a cooking program to the cooking appliance 404 or new firmware to the cooking appliance.

A cooking program may include, for example, a program type, a program start time (e.g., immediately or at a determined future time), and a recipe or dish title (e.g., eggs, steak). The cooking program may also specify a set-point temperature for the liquid bath 416 (e.g., 60° C., 75° C.) of a sous vide cooker. The cooking program may also specify a cooking duration, which may begin after a starting event. The starting event may be a time when the cooking program is received by the cooking appliance 404 or when the liquid bath 416 has been heated to a determined temperature (e.g., a set-point temperature). The starting event may also be when the cooking appliance 404 senses that the food product 418 has been inserted therein or when the user indicates the food product has been inserted into the cooking appliance 404. The starting event may also occur at a determined time or after a determined delay after one or more events.

The cooking program may also indicate whether the liquid bath 416 should be pre-heated prior to insertion of the food product 418 into the liquid bath. For example, the cooking program may specify that the liquid bath 416 should be heated to at least 40° C. before the food product is placed in the liquid bath. As another example, the cooking program may indicate that the food product 418 should be placed in the liquid bath 416 without pre-heating the liquid bath.

In some implementations, the cooking program may include parameters used to implement an accelerated cooking program. For example, an accelerated cooking program may cause the liquid bath 416 to be heated to a first temperature above a set-point temperature for a period of time, and then the temperature of the liquid bath may be reduced to a second temperature at or near the set-point temperature for the remainder of the cooking period. As discussed more below, the cooking program may utilize a characteristic of the food product (e.g., mass) or one or more measurements (e.g., temperature, power) to determine how much additional power is needed to heat the food product 418, and use full power delivery until that amount of power has been delivered.

The cooking program may also indicate whether the cooking appliance 404 should use the time-series data to determine or forecast near equilibrium conditions for the food product 418 indicative of completion of a cooking process.

In some implementations, the cooking program may indicate the amount of time the food product 418 should be held at the set-point temperature or at a safe holding temperature. For example, a cooking program may indicate that the set-point temperature is reduced to a lower temperature after the food product has been held at a higher temperature for a determined period of time. This feature may minimize or reduce undesirable texture changes in the food product that could occur if the food product is held at a relatively high temperature for an extended duration.

The cooking program may also include an indication relating to when the cooking program should be started. For example, the cooking program may wait for a command, wait a fixed amount of time, wait until the cooking appliance 404 is pre-heated, wait until the food product has been inserted into the cooking appliance, wait until a food product(s) is removed from the cooking appliance, etc.

The FPG system 420 may transmit various information or data to the cooking appliance 404 and/or the client computing device 102. For example, the FPG system 420 may transmit a cooking program to the cooking appliance 404 to control the operation thereof. The FPG system 420 may also transmit to the client computing device 102 a determination or estimation for when the cooking program will be completed. For example, the FPG system 420 may provide a notification on the client computing device 102 that indicates that the core of the food product will be 1° C. below a set-point temperature at a certain time (e.g., 103 minutes, 6:00 pm), so the user can plan to remove the food product from the cooking appliance 404 at that time.

The FPG system 420 may also provide suggestions to a user of the client computing device 102 based on food products currently or previously cooked by the user. For example, the FPG system 420 may recommend certain recipes or a particular doneness for a food product based on feedback gathered from past behavior of the user. Such feedback may be obtained by direct query of the user or may be obtained indirectly based on selections or actions performed by the user (e.g., selecting a particular doneness, selecting recipes in a certain class of recipes).

In some implementations, the time-series data may be filtered before used in other algorithms or methods. For example, noise may be reduced or removed from the time-series data using one or more low pass filters, total variation minimization methods, moving averages, iterative moving averages, polynomial or rational exponential fitting using various norms (e.g., L1 or L2) for minimization, or the like. In some implementations, localized disruptions, such as spikes or missing data points, may be removed. In some implementations, variable time-series data may be changed into fixed time-series data through interpolation, or fixed time-series data may be changed to variable time-series data.

Using the time-series data and the state of the cooking appliance 404, the FPG system 420 may measure or determine one or more liquid bath characteristics, food product characteristics, and/or liquid bath and food product interaction characteristics. Liquid bath characteristics may include, but are not limited to, volume, mass, initial temperature, thermal loss or gain from the environment through conduction through the container, thermal loss or gain from the environment from radiation, thermal loss to the environment from evaporation, or change in mass and volume from evaporation.

Food characteristics may include, but are not limited to, surface area, mass, volume, shape, initial temperature, state (e.g., partially frozen, fully frozen, slushy, thawed).

Liquid bath and food product interaction characteristics may include the efficiency of the liquid bath to heat the food product as measured by the thermal heat transfer coefficient between the liquid and the food product. Liquid bath and food product interaction characteristics may also include when one or more pieces of a food product are inserted into the liquid bath, which could occur before the liquid starts to heat, while the liquid is heating or after the liquid has heated to a determined temperature.

Using the time-series data and one or more of the characteristics discussed above, the FPG system 420 may perform various functions. For example, the FPG system 420 may determine or estimate how long it will take the liquid bath 416 to reach a set-point temperature. As another example, the FPG system 420 may determine or estimate when the food product 418 will be heated to a particular temperature. After heating the food product 418 to the particular temperature, the FPG system 420 may either hold the liquid bath 418 at that temperature or reduce the temperature to a safe holding temperature.

The FPG system 420 may also generate a rapid or accelerated cooking program. Additionally, if there is a failure, such as a power interruption, the FPG system 420 may determine whether the food is still safe for consumption. For example, the FPG system 420 may determine for how long and at what temperatures the food product was in a range that promotes foodborne pathogen growth. Further, after a recognized power interruption, the FPG system 420 may determine whether any modifications to the cooking program are required and cause such modifications to be implemented.

Figure 4B:
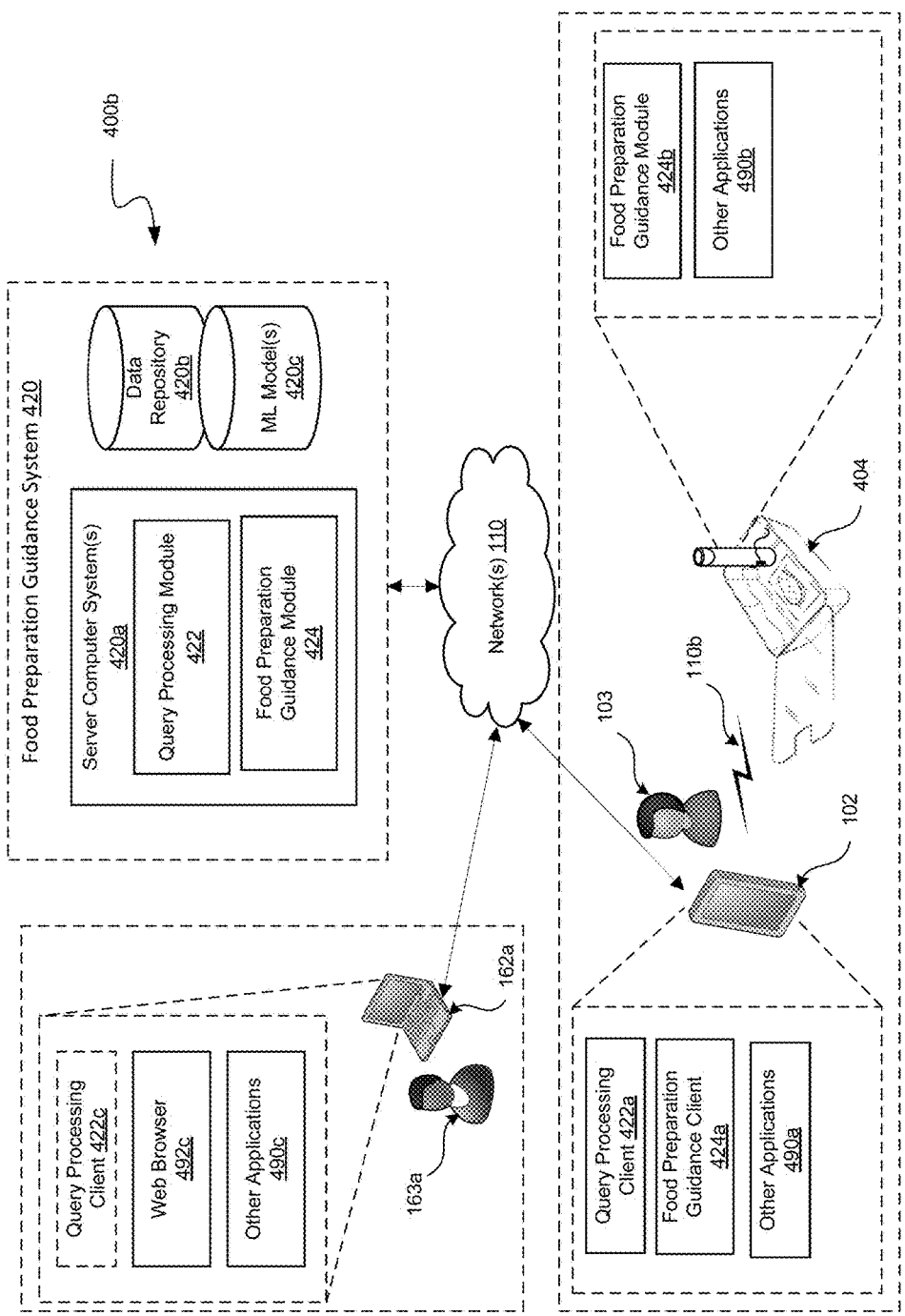
FIG. 4B is a schematic view of a second example networked environment in which a food preparation guidance system with integrated query response functionality system may be implemented.

FIG. 4B shows another example networked environment 400b illustrating the integration of query processing techniques with a system for automated food preparation and guidance. As shown in FIG. 4B, and similar to the environment 400a depicted in FIG. 4A, example environment 400b includes a client device 102 and a cooking appliance 404 associated with a user 103.

In the environment 400b depicted in FIG. 4B, the client device 102 include one or more client applications such as a query processing client 422a, a food preparation guidance client 424*a*, and other applications 490*a*. As previously discussed, a query processing system and/or FPG system can be implemented according to a client-server model. In this context depicted in FIG. 4B, the query processing client 422*a* may represent the client side portion of the query processing module 422 associated with FPG system 420. Similarly, the food preparation guidance client 424*a* may represent a client side portion of the food preparation guidance module 424 of FPG system 420. In both cases, the client side portion may represent a thin client providing only limited functionality to interface with the FPG system 420 via networks 110. In some embodiments the client side portions may have a more substantial processing component. For example, query processing client 422*a* may include any one or more of the sub modules of module 122 depicted in FIG. 2. As an illustrative example, query processing client 422*a* may include a messaging interface and an intent recognition module to parse received messages from user 103, determine an intent, and generate structured data indicative of the determined intent of the message which is then transmitted to the server side component of FPG system 420 for additional processing.

In the example environment 400*b*, the client device 102 wirelessly communicates with the cooking appliance 404, for example, via a local wireless communication protocol (e.g., Bluetooth). For example, as shown, communication between the client device 120 and the cooking appliance 404 may be via FPG clients 424*a* and 424*b* (respectively). In other words, in this example, the cooking appliance may not have any direct communication link to the server side component of food preparation guidance module 424. In other words, the linked client device 102 may serve as a communications bridge between the respective components.

Also depicted in environment 400*b* is another user 163*a* associated with a device 162*a-c*. Recall that the other user 163*a* may be one of many crowd sources 160. As shown in FIG. 4B, the client device 162*a* of user 163*a* may, in some embodiments, include query processing client 422*c*. For example, FPG system 420 may, in some embodiments, manage an organized community of users as sources of responses to queries from other users. To be part of the community of crowd sources, the user 163*a* may install a client side component 422*c* (e.g., an app) of the query processing system at their device 162*a*. It should be noted that this is not needed in all embodiments. As previously discussed, the crowd sources 160 may represent any user connected to a network whether affiliated or completely unaffiliated with the FPG system 420. For example, communication with the other user 163*a* may be accomplished via a web browser 492*c*, or any other client side applications 490*c* (e.g., specialize messaging apps, social media apps, etc.).

Figure 4C:
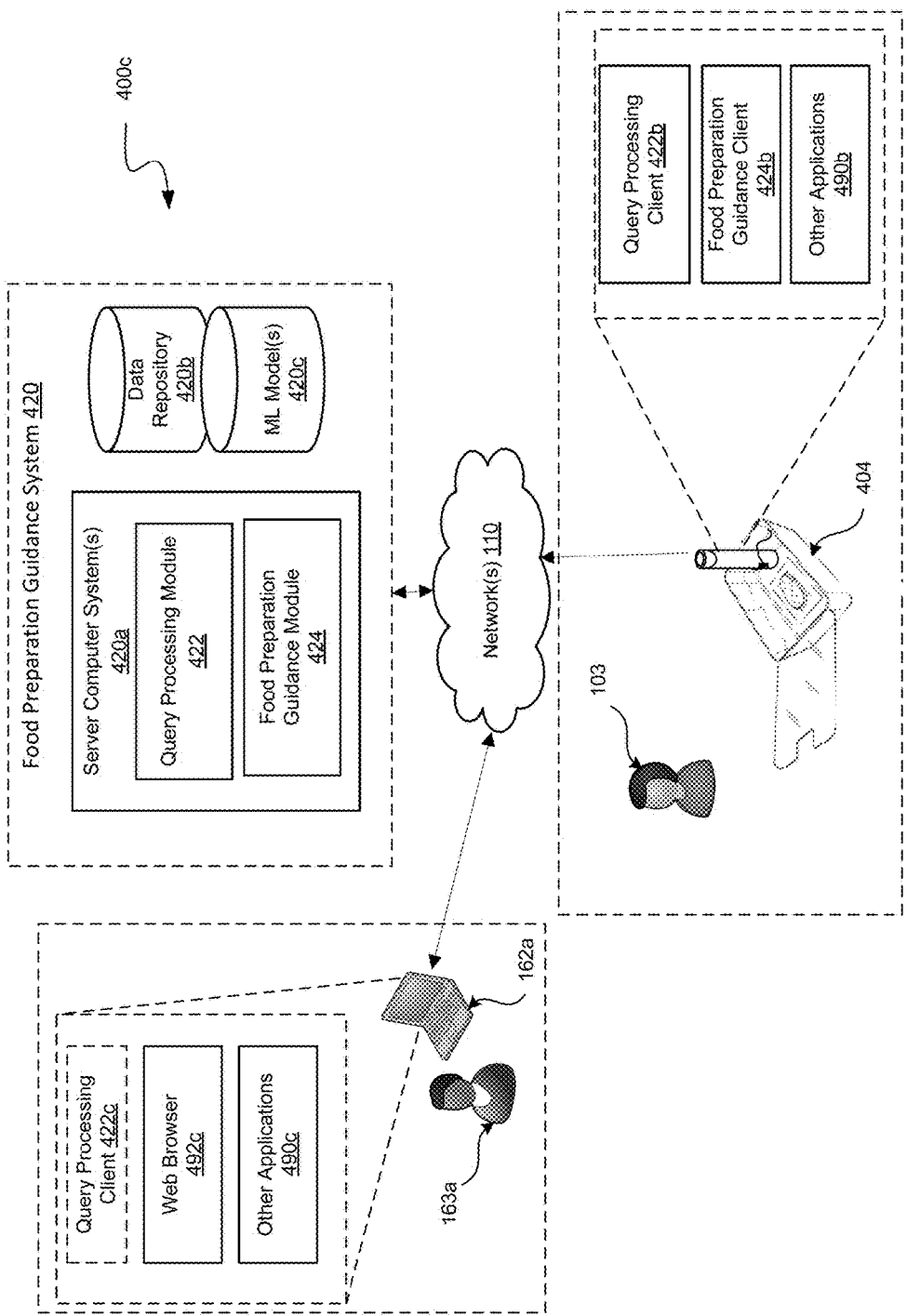
FIG. 4C is a schematic view of a third example networked environment in which a food preparation guidance system with integrated query response functionality system may be implemented.

FIG. 4C shows another example networked environment 400*c* illustrating the integration of query processing techniques with a system for automated food preparation and guidance. The example environment 400*c* depicted in FIG. 4C is similar to the environment 400*b* depicted in FIG. 4B except that it does not include a client device 102. As shown, in the example environment 400*c*, the cooking appliance 404 includes a query processing client 422*b*, a food preparation guidance client 424*b*, and other applications 490*b*. As described with respect to the query processing client 422*a* and food preparation guidance client 424*a* in FIG. 4B, the query processing client 422*b* and food preparation guidance client 424*b* at the cooking appliance 404 may represent the client side components of query processing module 422 and food preparation guidance module 424 (respectively).

In the example environment 400*c* depicted in FIG. 4C, a user 103 may interact directly with the cooking appliance 404, for example, to ask questions, receive responses to questions, and input feedback regarding the provided responses. For example, a user 103 may input messages through speaking which are received via microphones at the cooking appliance 404. Responses (whether from the FPG system 420 or another user 163*a*) can similarly be output to the user 103 audio messages.

Example Process for Controlled Food Preparation with a Cooking Appliance

Described below is an example process of operating a processor-based device to control preparation of a food product in a food preparation guidance (FPG) system, such as the FPG system 420 of FIGS. 4A-4C. In some embodiments, the example process may be carried out by the execution of instructions associated with food preparation guidance module 424. For explanatory purposes, the example process is discussed in the context of a sous vide cooking process, but the method is not limited to such a cooking process. For example, the example process may be implemented using a baking oven or other cooking appliance. As noted above, sous vide is a method of cooking food in a liquid bath or in a temperature-controlled steam environment for longer than normal cooking times at an accurately regulated temperature much lower than normally used for conventional cooking. In some instances, the food is sealed (e.g., liquid-tight, air-tight) in plastic bags. Sous vide cooking techniques typically employ temperatures around 55° C. to 80° C. for meats and higher for vegetables. The intention is to cook the item evenly, ensuring that the inside is properly cooked without overcooking the outside, and retain moisture.

Notably, the approaches described herein provide updates to cooking programs and/or estimations about cooking processes by obtaining one or more measurements from a cooking appliance and making decisions based on the obtained measurements.

In some embodiments, the example process may start in response to an opening of a specific application or selection of an icon displayed on a display of a computing device. In response, the processor-based device may cause a display or presentation of a splash screen or introduction screen.

Next, the processor-based device may receive a request for preparation of a food product. For example, the processor-based device may receive a request for preparation of a steak from a user-operated client computing device over a communications network. The user may select a recipe or may manually enter instructions into a user interface via the client computing device and/or via the cooking appliance.

Next, the processor-based device may provide a prompt for an ending condition, preference or characteristic for the selected food product, for instance, via a display of the computing device. For example, the processor-based device may display or cause to be displayed an egg white texture prompt screen that allows a user to view and scroll through images of egg whites having differing textures (e.g., runny, medium, firm). Various user interface elements may be employed, including those commonly associated with touchscreen interfaces allowing multi-finger input, tapping, and swiping. In some implementations, a set of at least two graphical prompts may include a set of still images in addition to or instead of a set of videos. In some implementations, each video or image may also include audio which may allow the user to observe additional information about a characteristic of the cooked food product (e.g., crispness, crunch, etc.). In some embodiments, a set of audio clips without visual prompts is provided.

The processor-based device may receive a selection indicative of an ending condition or preference for the food product. For example, the processor-based device may detect an input or selection of a slide bar via a touchscreen display.

The processor-based device determines a cooking program based at least in part on the received selection indicative of the food product to be prepared and/or an ending preference. For example, the processor-based device may perform one or more simulations utilizing the selected food product and ending preferences as inputs to determine a cooking time and a cooking temperature to cook the food product to achieve the selected ending preferences (e.g., texture, consistency, doneness). The processor-based device may determine one or more general food preparation parameters for the cooking program using any suitable methods, such as one or more simulations, modeling, one or more lookup tables, one or more analytical or numerically solvable equations, or the like.

The processor-based device sends the generated or determined cooking program to the cooking appliance. For example, the FPG system 420 of FIGS. 4A-4C may send the determined cooking program to the cooking appliance 404 over the communications network 110 directly or via the client computing device 102.

The cooking appliance executes the cooking program. For example, the cooking program may provide instructions to the cooking appliance to heat a liquid bath to 60° C., to alert a user to insert the food product into the liquid bath when the liquid bath reaches 60° C., and to hold the temperature of the liquid bath for three hours.

The cooking appliance obtains measurements, and stores these measurements in a data store as a time-series. As discussed above, these measurements may be obtained by sensors (see FIG. 9) that directly or indirectly measure one or more of temperature, power, fluid flow, the presence or absence of a food product, liquid level, power disruptions, etc. This time-series is a record of the obtained measurements at different times. The time-series data may be arranged in chronological order or reverse chronological order. The time period between measurements may be constant or variable.

Next, the processor-based device may receive some or all of the measurements obtained by the cooking appliance. For example, the FPG system 420 of FIGS. 4A-4C may obtain some or all of the measurements from the cooking appliance 404 over the communications network 110 directly or via the client computing device 102. In some implementations, the cooking appliance may transmit a subset of the time-series data that includes the most recent measurement or the measurements obtained since the previous successful transmission of the measurement data to the client computing device or to the FPG system.

In addition to receiving the time-series data, the processor-based device may receive metadata, such as the type of cooking appliance, user information, or recipe information. If the transmission of data includes all the information needed by the FPG system 420 to determine or update the cooking program, the transmission may be referred to as a "system state" transmission. If the transmission of data does not include all the information needed by the FPG system 420 but is sufficient when combined with previously sent information, the transmission may be referred to as a "system state update" transmission.

The processor-based device may update the cooking program and/or generated one or more projections about the cooking process based on the system state of the cooking appliance. As discussed above, the system state may be a synthesis of several system state updates. The updated cooking program may be sent to the cooking appliance for execution thereby. For example, the updated cooking program may alter control of one or more operational parameters of the cooking appliance (e.g., temperature, time, speed, humidity, pressure). The one or more generated projections may be provided to a user via a suitable interface, such as a user interface of a computing device and/or a user interface of the cooking appliance.

For example, based on the system state, the FPG system 420 may determine how long it will take for a liquid bath of the cooking appliance to reach a set-point temperature. As another example, the FPG system 420 may determine when the food product will be heated to a particular temperature and, after heating to the particular temperature, may hold the liquid bath at that temperature or may reduce the temperature to a safe holding temperature.

The FPG system 420 may also determine when the food product has been heated to a particular fraction of the difference between the temperature of the liquid bath and the initial temperature of the food product. After heating the food product to this temperature, the liquid bath may either be held at that temperature or reduced to a safe holding temperature.

The processor-based device may display or cause to be displayed the determined more accurate cooking process projection on the display of the computing device or the cooking appliance, as discussed above. The user may then utilize the provided projection for planning or other purposes.

In some embodiments, the example process for controlled cooking runs concurrently with other methods or processes, for example as part of or in parallel with the question and answer process 300a described with respect to FIG. 3A, or as one of multiple threads on a multi-threaded processor system.

In some implementations, the FPG system 420 may utilize feedback to a priori adjust one or more parameters (e.g., food preparation parameters, prompts, recommendations) for an individual user, group, friends of one or more individual users, geographic locale, or all users. For example, in some implementations, the FPG system 420 gathers ratings from users, and the ratings may be used to adjust one or more parameters or recommendations for one or more users. As another example, the FPG system 420 may gather information manually or automatically from users or from third party entities (e.g., social networks, retail web sites, etc.) that may be used to adjust one or more parameters, recommendations, or other features of the system for one or more users.

As noted above, the cooking appliance, computing device, and/or the FPG system 420 may utilize various inputs to generate cooking programs, updates to cooking programs, and/or projections about one or more cooking processes.

One such input is power delivered by the cooking appliance. Power may be measured directly or indirectly, or may be derived using one or more parameters. For example, actual power may be measured using a sensor (see FIG. 9) that senses one or both of voltage and current drawn by the cooking appliance or supplied by the cooking appliance to a heating element.

Another input that may be used by the FPG system 420 is temperature. For example, the cooking appliance may be equipped with a temperature sensor positioned at an inlet of a circulator pump or stirring system. The temperature sensor may be any suitable sensor, such as a thermocouple, thermistor, platinum resistance temperature detector (RTD), positive temperature coefficient (PTC) heater/element, or blackbody/infrared emissions detector.

Another input that may be used by the FPG system 420 is fluid flow. Any suitable device may be used to measure fluid flow in a cooking appliance including, but not limited to, a PTC heater/element, an impeller, etc.

Other inputs that may be used by the FPG 420 system include user inputs. Such user inputs may include information about when a food product has been inserted into the cooking appliance, characteristics about the food product or information about the cooking appliance. For example, characteristics of the food product may include its mass or weight, volume, surface area, type, temperature, etc. Information about the cooking appliance may include the type of vessel in which a thermal immersion circulator has been inserted, whether a vessel is covered, the size of a vessel, the volume of liquid in a liquid bath, whether a vessel is insulated, etc.

The FPG system 420 may also make assumptions about a cooking appliance which may circumvent the need to measure any one or more of voltage, current or resistance to determine power delivery. As an example, the FPG system 420 may use the output from a PID controller to approximate the power delivered by the heater. Further, the FPG system 420 may make assumptions about the efficiency of a liquid bath for heating a food product, as measured by a surface heat transfer coefficient of the liquid to the food product. The FPG system 420 may also make assumptions about a cooking appliance (e.g., vessel size) based on characteristics of the cooking appliance identified during previous use of the cooking appliance or previous use of similar cooking appliances. The characterizations of the cooking appliance may be based on a manufacturer's design or on empirical measurements of the same or similar cooking appliances, or based on physics calculations. As an example, assumptions may be made relating to the electrical properties of a heater element of a cooking appliance, such as the heater element's resistance versus temperature behavior.

Example User Interface Interactions

FIGS. 5-8E illustrate example user interfaces through which a user 103 (or other users 163*a-c*) may interact with a query processing system 120 and/or an FPG system 420 according to the present teachings. For clarity, embodiments will be described in the context of interaction between a user 103 and an FPG system 420, however the example interaction scenarios may similarly apply to a query processing system 120 that is unaffiliated with food preparation. As will be demonstrated, in some cases interaction may be via graphical user interfaces, audio interfaces, or any combination thereof.

Figure 5:
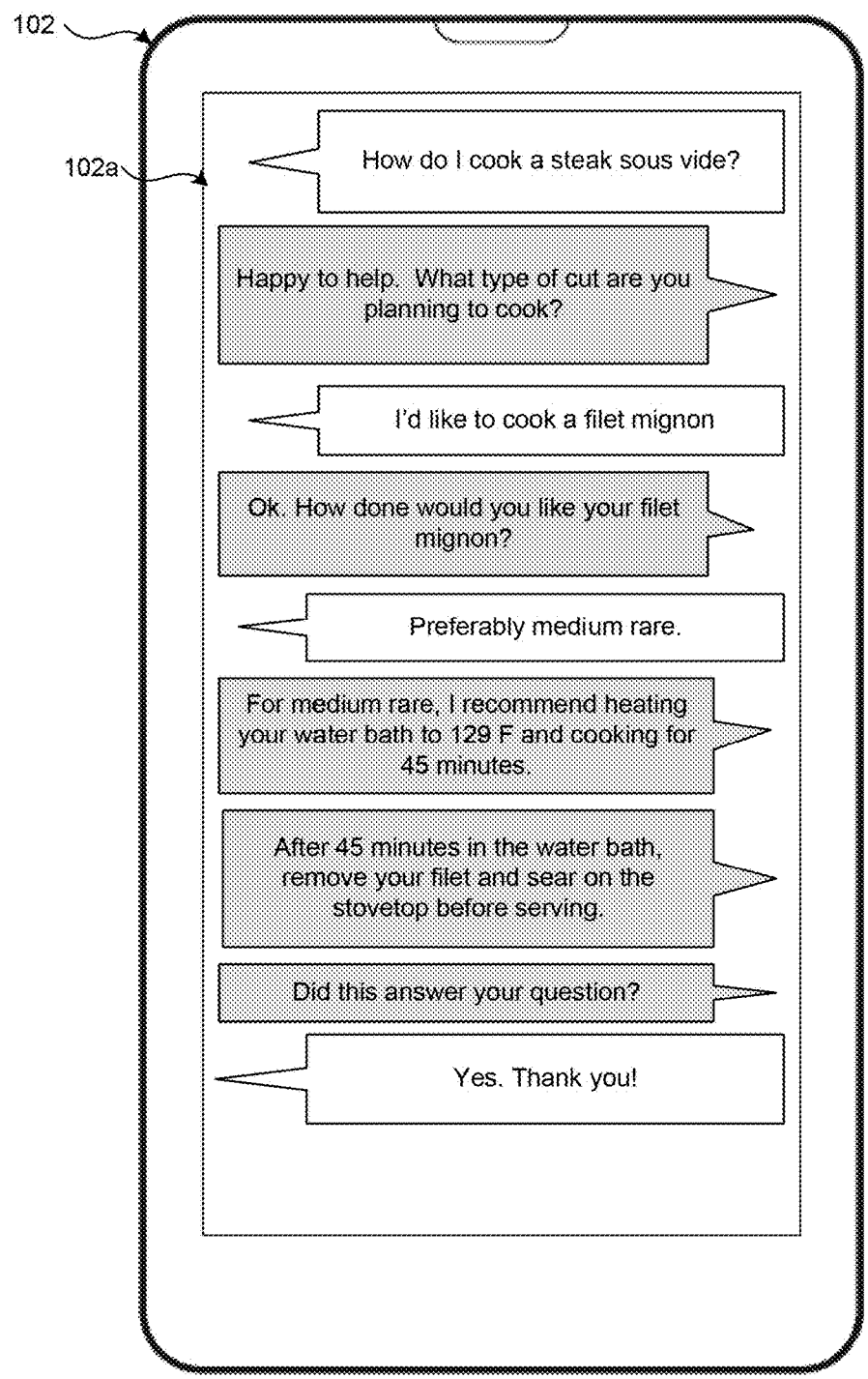
FIG. 5 shows a screen capture of an example user interaction via a graphical user interface of a client device.

FIG. 5 shows an example user interaction via a graphical user interface, for example, displayed via a screen 102*a* (e.g. a touch screen display) of a client device 102 (e.g., a smart phone). As shown, graphical elements are displayed with text corresponding to messages input by the user 103 and output by the FPG system 420 (shaded in gray). The interface depicted in FIG. 5 may be generated via a client application managed by the FPG system 420 or may be via a separate messaging application (e.g., Facebook® Messenger). Note that the graphical interaction depicted in FIG. 5 could similarly be performed between a user 103 and an appliance such as a cooking appliance 404 provided the appliance includes a visual display and some means for receiving user input (e.g., a touch screen interface).

In the example interaction depicted in FIG. 5, the user 103 has input a message, "how do I cook a steak sous vide." In response, the FPG system 420 prompts the user for additional information regarding, for example, the cut of the steak and a desired doneness. With the additional information input by the user, the FPG system 420 outputs a response that answers their question (i.e., that matches a determined intent of the message with a certain level of confidence). Specifically, the FPG system 420 outputs a response recommending a method to cook the user's 103 steak using a sous vide cooking appliance.

Figure 6:
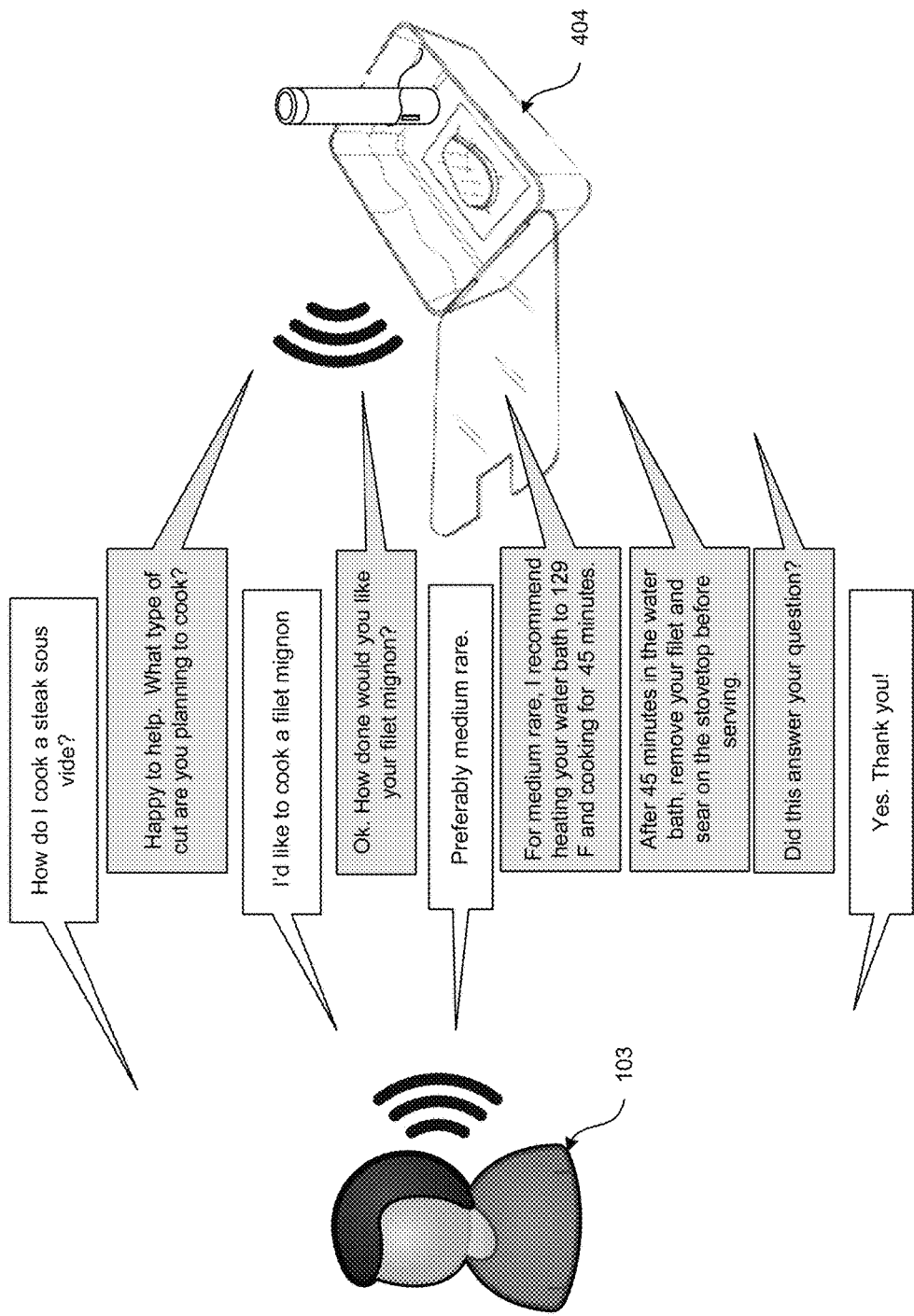
FIG. 6 an example user interaction via an audio interface of an appliance.

FIG. 6 shows the same user interaction depicted in FIG. 5 except via an audio interface. As shown in FIG. 6, a user 103 inputs messages by speaking into a microphone of a device, for example, a cooking appliance 404. Responses to the user 103 are output by generating audio from speakers associated with the device. Note that the audio interaction depicted in FIG. 6 could similarly be performed between a user 103 and a client device 102 such as a smartphone that is equipped with speakers and microphone.

Figure 7:
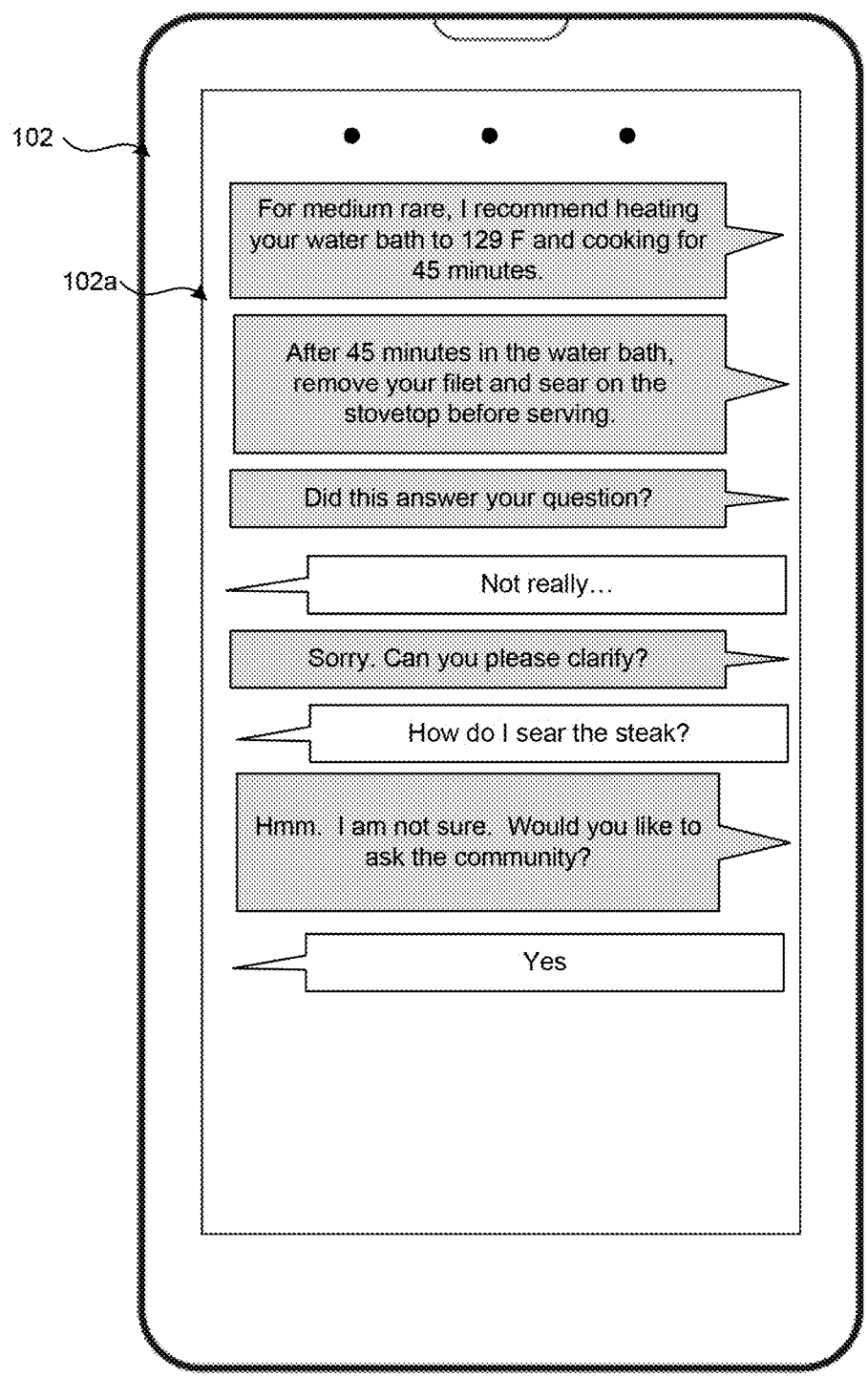
FIG. 7 shows a screen capture of an example user interaction, via a graphical user interface, to a prompt for permission to crowd-source a response.
Figure 8A:
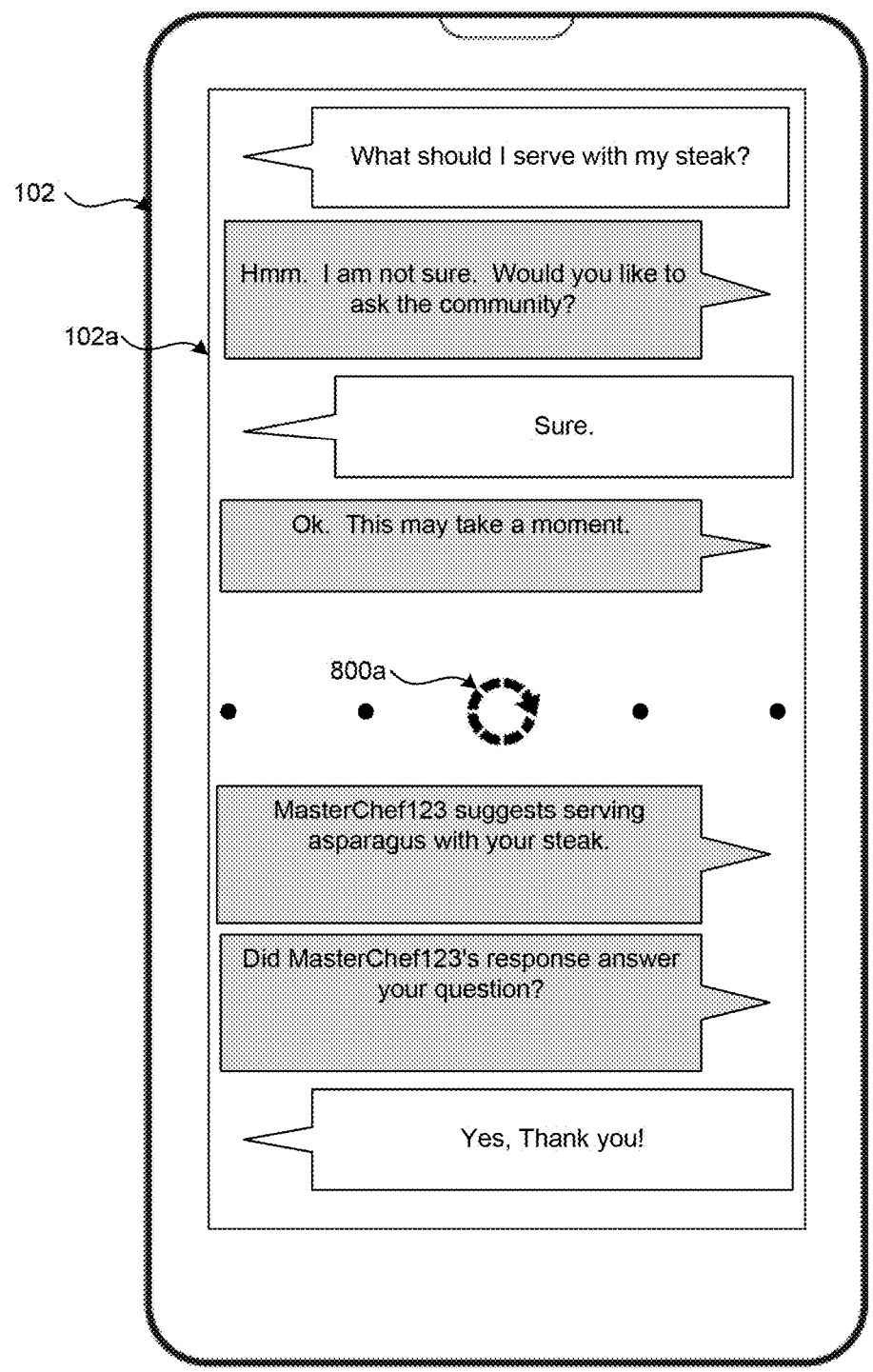
FIG. 8A shows a screen capture of a first example output, via a graphical user interface, of a crowd-sourced response to a user query.
Figure 8B:
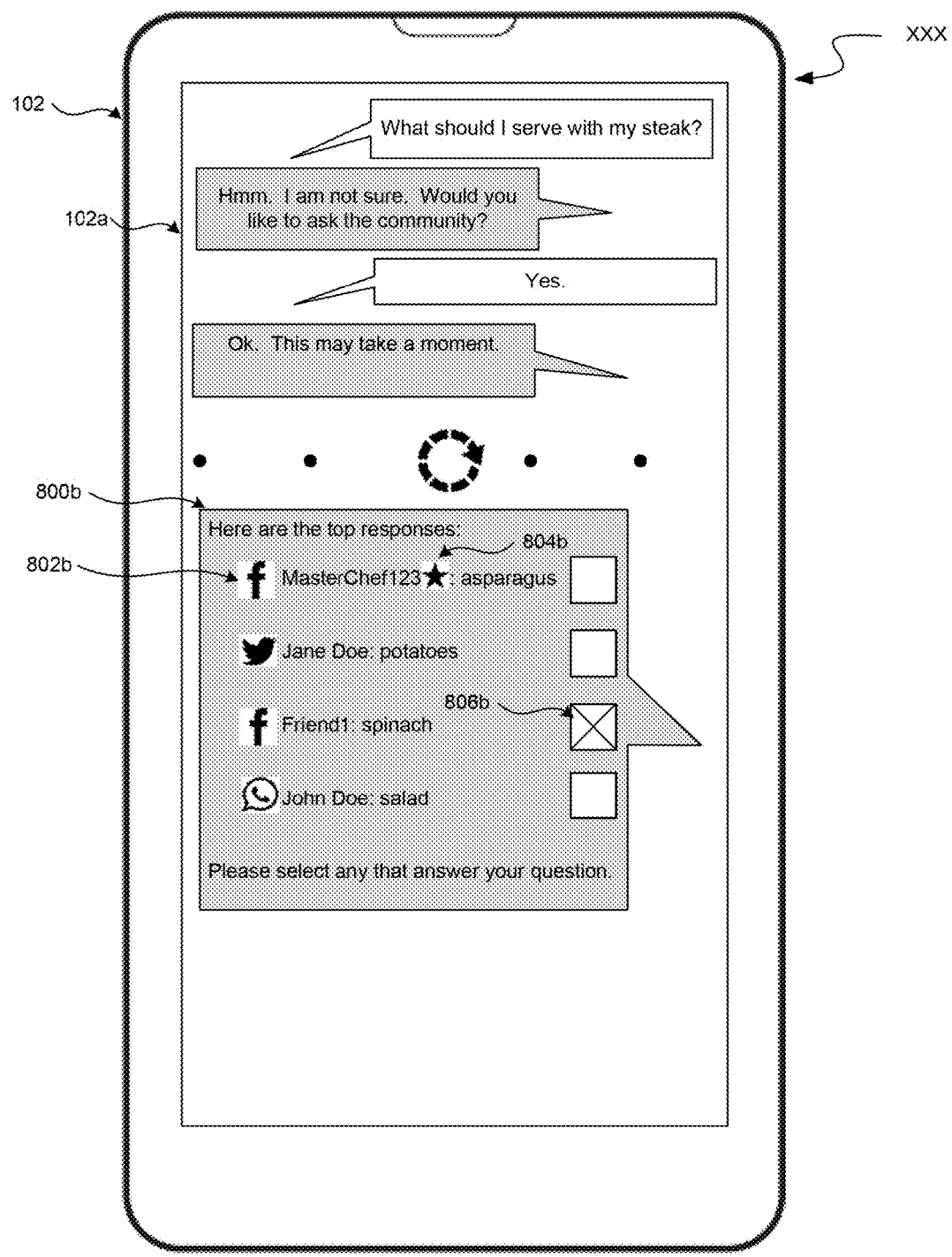
FIG. 8B shows a screen capture of a second example output, via a graphical user interface, of a crowd-sourced response to a user query.
Figure 8C:
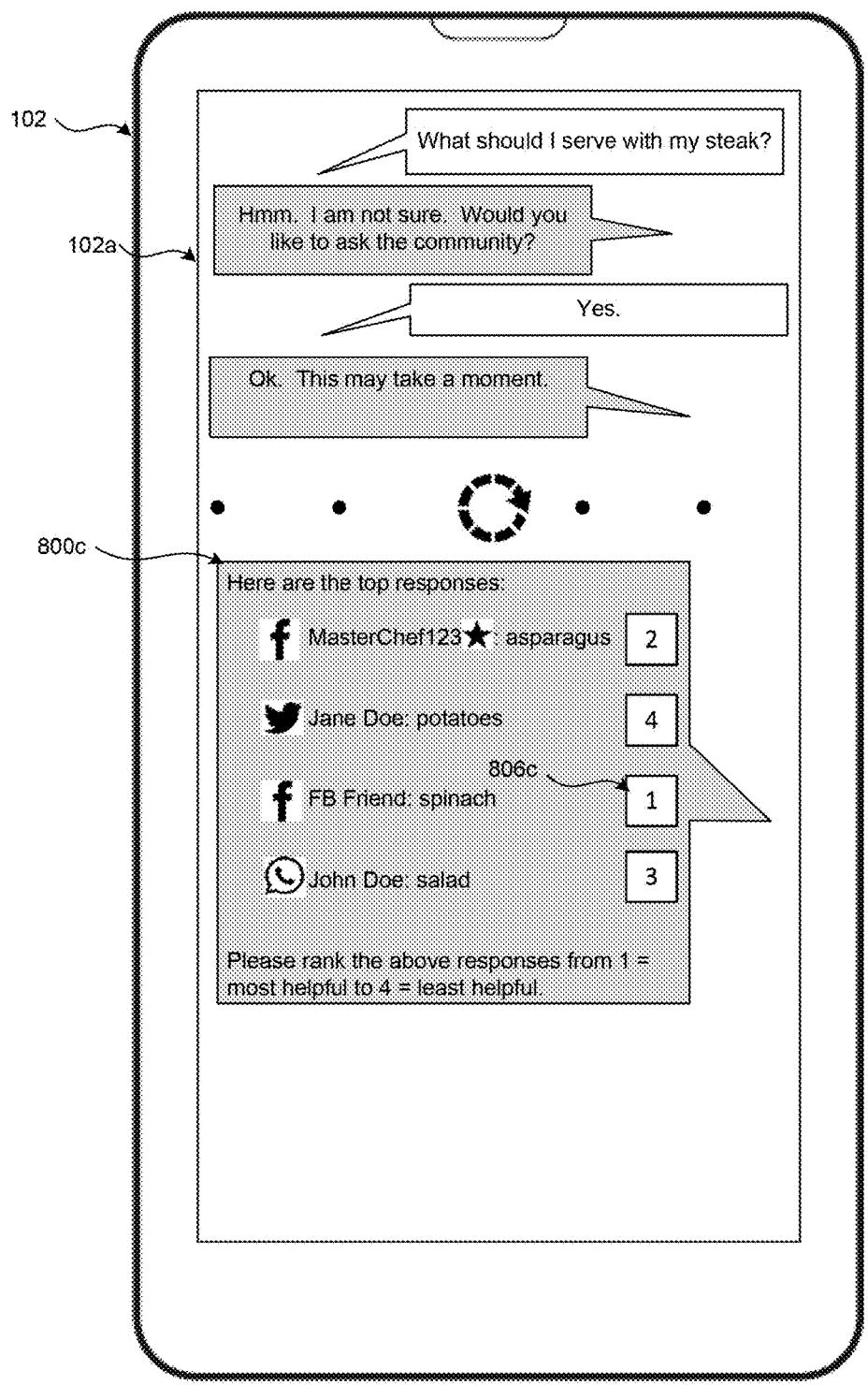
FIG. 8C shows a screen capture of a third example output, via a graphical user interface, of a crowd-sourced response to a user query.
Figure 8D:
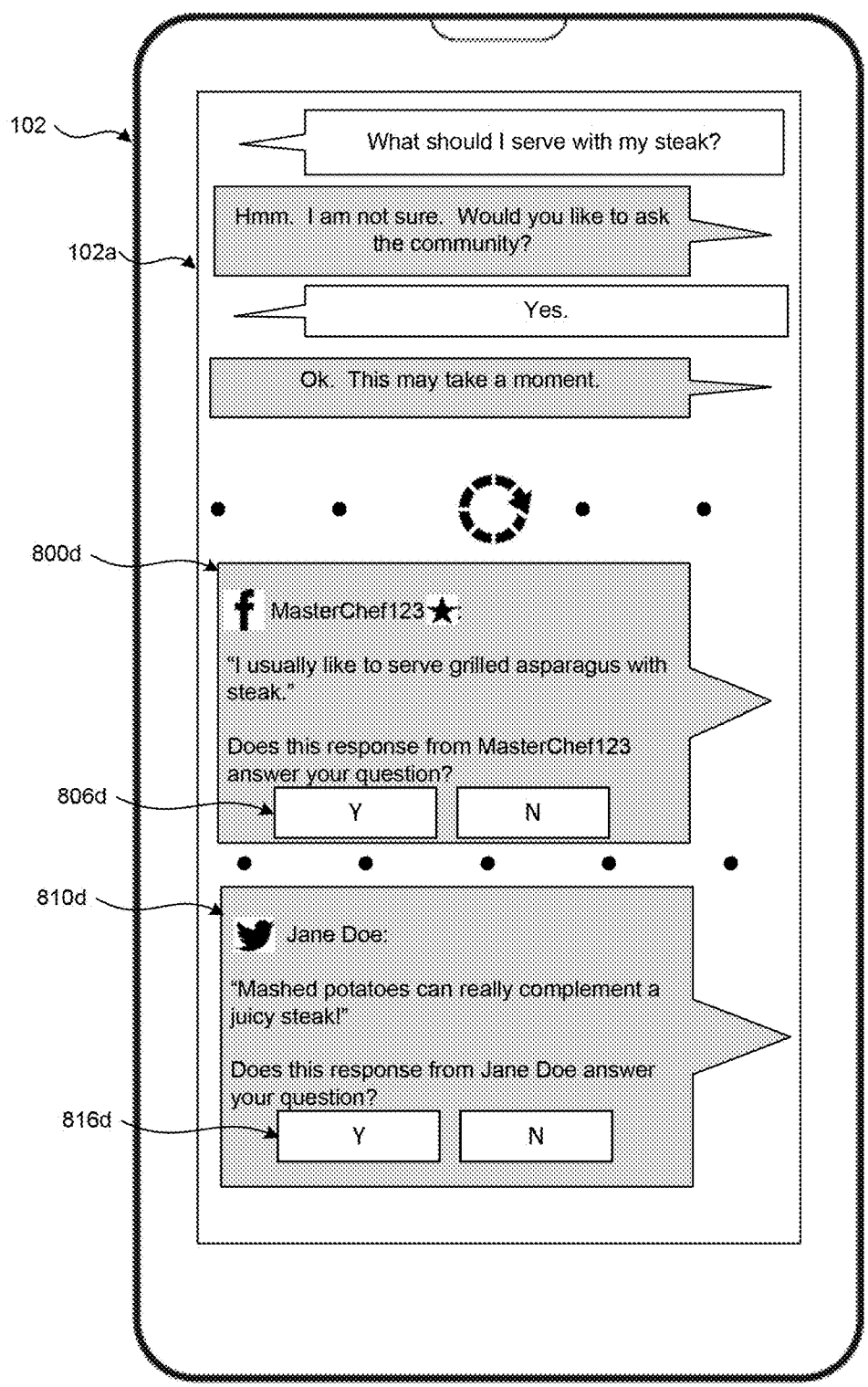
FIG. 8D shows a screen capture of a fourth example output, via a graphical user interface, of a crowd-sourced response to a user query.
Figure 8E:
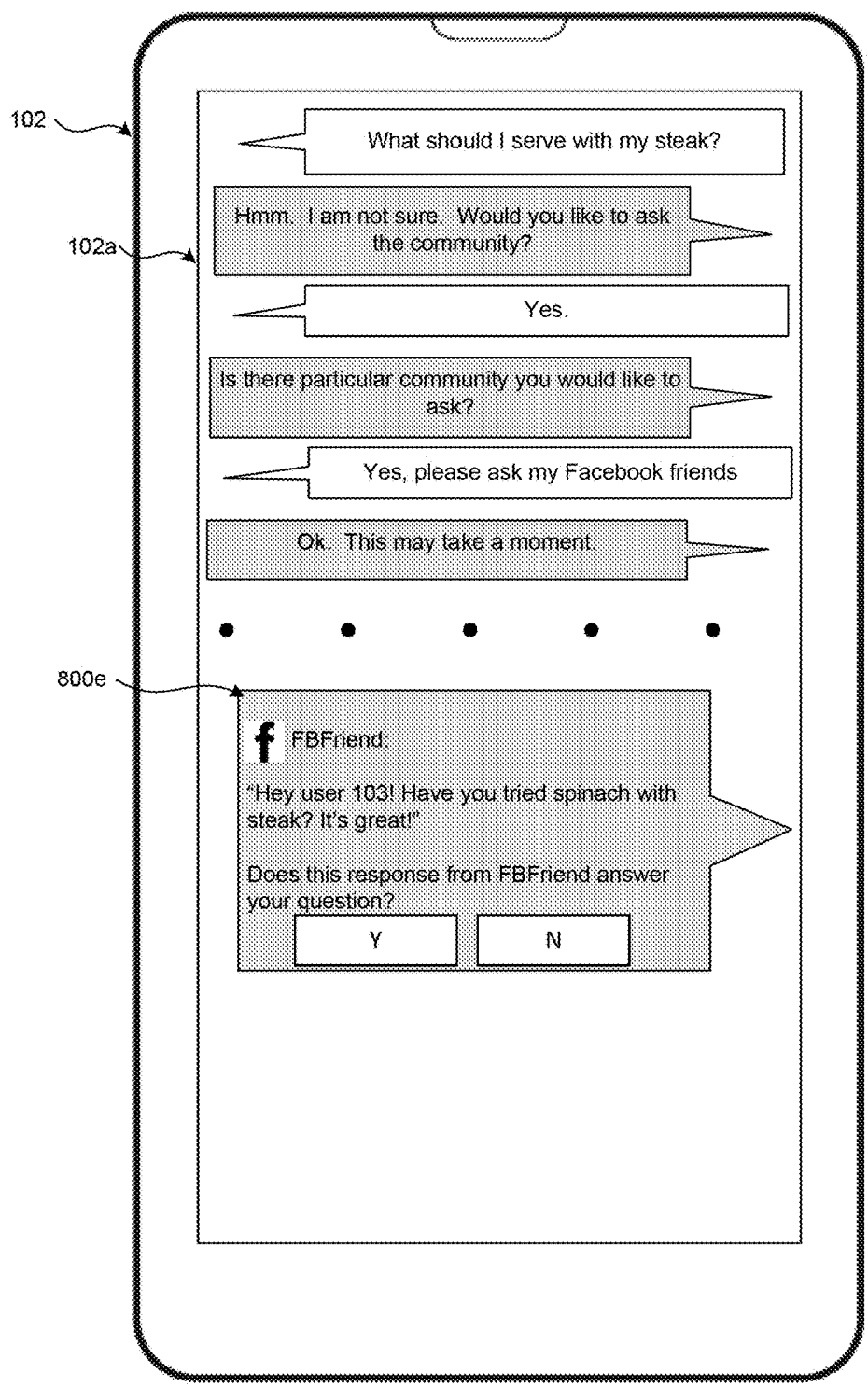
FIG. 8E shows a screen capture of a fifth example output, via a graphical user interface, of a crowd-sourced response to a user query.

FIGS. 7-8E illustrate example interactions between the user 103 and the FPG system 420 where the FPG system 420 does not know the answer and turns to a community response mode. For conciseness, the example interactions of FIGS. 7A-8E are depicted as being via a graphical user interface (e.g., as described with respect to FIG. 5), however such interactions may similarly be performed via other means such as an audio interface (e.g., as described with respect to FIG. 6).

In the example interaction depicted in FIG. 7, in response to a prompt for feedback from the FPG system 420, the user 103 inputs a message indicating that the system's response did not satisfactorily answer the user's 103 original question. In this example, the FPG system 420 initially prompts the user 103 for clarification as to what was deficient in the response. In other words, the FPG system 420 is prompting the user 103 to input a new message, in this case, with a new query. Here, the user 103 clarifies, by asking, "how do I sear the steak." If the FPG system 420 does not know the answer to this question, the system prompts the user 103 for permission to "ask the community." In other words, the FPG system 420 prompts the user 103 for permission to enable access to the user's query to other users.

FIGS. 8A-8E illustrate example interactions between the user 103 and the FPG system 420 that illustrate various technique for outputting responses to user queries received from other users 163*a-c* (i.e., "crowdsourced" or "community" responses).

In the example interaction depicted in FIG. 8A, the user 103 has input a message, "what should I serve with my steak." The FPG system 420 does not have a response and so prompts the user 103 for permission to enable access to the user query to other users (i.e., to ask the community). The user 103 replies with a message indicating permission to ask the community.

At this point, the FPG system 420 enables access to the user's question to one or more other users 163*a-c*, for example as described with respect to FIG. 3A. As indicated in FIG. 8A, the process of posting the user's query to one or more community forums and receiving one or more responses from other users may take time, and therefore the FPG system 420 outputs an initial message indicating as such. In some embodiments, a graphical element 800*a* is displayed in the message feed indicating that a process is occurring in the backgrounds and encouraging the user 103 to wait for completion of the process. For example, the graphical element 800a may comprise some type of animated graphical element like a rotating circle indicating an ongoing process.

In the specific example illustrated in FIG. 8A, the FPG system 420 outputs a message based on a response from a single other user, "MasterChef123." Recall, that responses from other users may be output in a number of different was. For example, the FPG system 420 may simply output a messages based on community responses as they are received. Alternatively, the FPG system 420 may wait for a particular period of time and output one or more community responses that best match an intent of the user's 103 query. In this example, the FPG system 420 may have reformulated the response from the other user 163a-c, for example, based on an identified keyword that answers the user query. For example, the other user 163a-c (in this case MasterChef123) may have input a response stating, "I really like asparagus with steak." The FPG system 420 may receive the response from the other user 163a-c, parse out the keyword "asparagus" that matches an intent of the user's 103 query, and reformulate a new response message, for example based on a template, that incorporates the keyword "asparagus" to output to the user. Here, the FPG system 420 has reformulated the original message from MasterChef123 to instead read "MasterChef123 suggests serving asparagus with your steak," as illustrated in FIG. 8A.

After outputting the crowd-sourced response from MasterChef123, the FPG system 420 prompts the user for feedback regarding the output response, for example, by outputting a follow up message stating, "Did MasterChef123's response answer your question?" Here the user 103 has indicated in a following message that the response has answered their question.

FIG. 8B shows a similar interaction as depicted in FIG. 8A except that the FPG system 420 has returned responses from multiple other users 163a-c. For example, as shown in FIG. 8B, the responses from the multiple other users 163a-c, are output via a graphical element 800b. The example graphical element 800b depicted in FIG. 8A includes a listing of the multiple responses. For example, MasterChef123 has responded with "asparagus," while other users have responded with "potatoes," "spinach," and "salad."

In addition to including an identifier associated with the responding user (e.g., a user name such as "MasterChef123," the graphical element 800b may identifiers associated with a forum or platform though which the response was received. For example, graphical element 800b includes icons 802b next to the usernames of other users 163a-c indicating a social media platform (e.g., Facebook®, Twitter®, WhatsApp®, etc.) through which the their respective responses were received.

In some embodiments, the graphical element 800b may include an indication of a reputation level of any of the responding other users 163a-c. For example, graphical element 800b in FIG. 8B includes a star icon 804b adjacent to the username "MasterChef123" indicating that that user has a high reputation level. Again, this reputation level may be based on any number of factors, specific to, or outside of, interactions with the FPG system 420.

As with the example depicted in FIG. 8A, the example in FIG. 8B also includes a prompt by the FPG system for user feedback regarding the output crowd-sourced responses. Specifically, as shown in FIG. 8B, the prompt may include an interactive element (e.g., the selectable boxes 806b) through which a user 103 may select one or more of the responses that best answer the user query.

The interactive feedback element 806b is just an example provided for illustrative purposes. A person having ordinary skill will recognize that other interactive mechanisms may be employed to similar effect. For example, as depicted in FIG. 8C, in some embodiments, the FPG system 420 may prompt the user 103 to rank the one or more output responses from other users 163a-c. FIG. 8D shows yet another example in which the actual input messages from each of the other users are output via a graphical element 800d, 810d (e.g., as they are received), The graphical elements 800d, 810d, include prompts for the user 103 to indicate if each response satisfactorily answers their question, for example, by selecting a yes or now button 806d, 816d (respectively).

As previously discussed, in some embodiments, use 103 may restrict access to their query to a particular set of other users. For example, as shown in FIG. 8E, before enabling access to the other users 163a-c, the FPG system 420 prompts the user 103 for a selection of a particular subset of other users 163a-c, for example, by asking if they would like to "ask a particular community." As shown in FIG. 8E, the user 103 has responded in the affirmative requesting that the FPG system 420 restrict access only to the user's 103 Facebook® friends. In such an situation, the FPG system 420 may respond in a number of different ways. For example, the FPG system 420 might individually message each of the user's 103 Facebook® friends (via Facebook® or otherwise) with the user query. In some situations, the FPG system 420 might automatically post the user query to the user's 103 Facebook wall that is visible to the user's 103 friends. The posting may include an interactive mechanism (e.g., a reply button) through which the user's 103 friends can reply with responses. Responses received from the user's 103 friends can then be output to the user, for example via a graphical element 800e as depicted in FIG. 8E.

Example Networked Processing System

FIG. 9 and the following discussion provide a brief, general description of the components forming an exemplary networked processing system 900 of device including a query processing system 120/FPG system 420, cooking appliance 404 and computing devices 102 (only one shown) in which the various illustrated embodiments can be implemented. The networked processing system 900 may, for example, implement the various functions and operations discussed immediately above in reference to FIGS. 1 and 4. Although not required, some portion of the embodiments will be described in the general context of computer-executable instructions or logic, such as program application modules, objects, or macros being executed by a computer. Those skilled in the relevant art will appreciate that the illustrated embodiments as well as other embodiments can be practiced with other computer system or processor-based device configurations, including handheld devices for instance Web enabled cellular phones or PDAs, multiprocessor systems, microprocessor-based or programmable consumer electronics, personal computers ("PCs"), network PCs, minicomputers, mainframe computers, and the like. The embodiments can be practiced in distributed computing environments where tasks or modules are performed by remote processing devices, which are linked through a communications network. In a distributed computing environment, program modules may be located in both local and remote memory storage devices.

The query processing system 120/FPG system 420 may take the form of a conventional PC, server, or other computing system executing logic or other machine executable instructions. The system 120, 420 includes one or more processors 906, a system memory 908 and a system bus 910 that couples various system components including the system memory 908 to the processor 906. The system 120, 420 will at times be referred to in the singular herein, but this is not intended to limit the embodiments to a single system, since in certain embodiments, there will be more than one system 120, 420 or other networked computing devices involved. Non-limiting examples of commercially available systems include, but are not limited to, an 80×86 or Pentium series microprocessor from Intel Corporation, U.S.A., a PowerPC microprocessor from IBM, a Sparc microprocessor from Sun Microsystems, Inc., a PA-RISC series microprocessor from Hewlett-Packard Company, or a 68xxx series microprocessor from Motorola Corporation.

The processor 906 may be any logic processing unit, such as one or more central processing units (CPUs), microprocessors, digital signal processors (DSPs), application-specific integrated circuits (ASICs), field programmable gate arrays (FPGAs), etc. Unless described otherwise, the construction and operation of the various blocks shown in FIG. 9 are of conventional design. As a result, such blocks need not be described in further detail herein, as they will be understood by those skilled in the relevant art.

The system bus 910 can employ any known bus structures or architectures, including a memory bus with memory controller, a peripheral bus, and a local bus. The system memory 908 includes read-only memory ("ROM") and random access memory ("RAM"). A basic input/output system ("BIOS"), which may be incorporated into at least a portion of the ROM, contains basic routines that help transfer information between elements within the system 120, 420 such as during start-up. Some embodiments may employ separate buses for data, instructions and power.

The data storage 954 may include a hard disk drive for reading from and writing to a hard disk, and an optical disk drive and a magnetic disk drive for reading from and writing to removable optical disks and magnetic disks, respectively. The optical disk can be a CD or a DVD, while the magnetic disk can be a magnetic floppy disk or diskette. The hard disk drive, optical disk drive and magnetic disk drive communicate with the processor 906 via the system bus 910. The hard disk drive, optical disk drive and magnetic disk drive may include interfaces or controllers (not shown) coupled between such drives and the system bus 910, as is known by those skilled in the relevant art. The drives and their associated computer-readable media provide nonvolatile storage of computer-readable instructions, data structures, program modules and other data. In some embodiments data storage 954 may comprise or form part of any of repositories 120b-c or 420b-c of systems 120 and 420 (respectively). Those skilled in the relevant art will appreciate that other types of computer-readable media may be employed to store data accessible by a computer, such as magnetic cassettes, flash memory cards, Bernoulli cartridges, RAMs, ROMs, smart cards, etc.

Program modules can be stored in the system memory 908, such as an operating system, one or more application programs, other programs or modules, and program data.

The application program(s) may include logic capable of implementing any of the aforementioned functions related to query processing and/or food preparation. For example, application programs stored in system memory may include any of query processing module 122, 422 or food preparation guidance module 424. Such application program(s) may, for example, be stored within the system memory 908 as one or more sets of logic or one or more sets of machine executable instructions.

The system memory 908 may include communications programs that permit system 120, 420 to access and exchange data with other networked systems or components, such as the cooking appliance 404, other computing devices 102, or any other external computer systems, for example those associated with external services 140, external data sources 150, and/or crowd sources 160.

The operating system, application programs, other programs/modules, program data and communications can be stored on the system memory or other data storage.

Authorized personnel can enter commands (e.g., system maintenance, upgrades, etc.) and information (e.g., cooking simulation parameters, equations, machine learning models, etc.) into the system 120, 420 using a user interface 912 that includes one or more communicably coupled input devices such as a touch screen or keyboard, a pointing device such as a mouse, and/or a push button. Other input devices can include a microphone, joystick, game pad, tablet, scanner, biometric scanning device, etc. These and other input devices are connected to the processing unit 906 through an interface such as a universal serial bus ("USB") interface that couples to the system bus 210, although other interfaces such as a parallel port, a game port or a wireless interface or a serial port may be used. The user interface 912 may include a monitor or other display device that is coupled to the system bus 910 via a video interface, such as a video adapter. In at least some instances, the input devices may be located proximate the system 120, 420, for example when the system is installed at the system user's premises. In other instances, the input devices may be located remote from the system 120, 420, for example when the system is installed on the premises of a service provider.

In some implementations, systems 120, 420 operate environments 100 an/or 400 using one or more of the logical connections to optionally communicate with one or more remote computers, servers and/or other devices via one or more communications channels, for example, one or more networks 110. These logical connections may facilitate any known method of permitting computers to communicate, such as through one or more LANs and/or WANs. Such networking environments are well known in wired and wireless enterprise-wide computer networks, intranets, extranets, and the Internet.

In some implementations, a network port or interface 956, communicatively linked to the system bus 910, may be used for establishing and maintaining communications over the communications network 110. Further, a database interface 952, which is communicatively linked to the system bus 910, may be used for establishing communications with the non-transitory processor-readable storage medium or data store 120b-c and/or 420b-c, which may be a part of the systems 120, 420 (respectively) or at least in operative communication therewith. For example, the data store 120b-c, 420b-c may include a repository for storing any one or more of image data, video data, audio data, text data, machine learning models, lookup tables, natural language processing algorithms, cooking programs, cooking simulation parameters, cooking simulation models, media files depicting ending gradations or preferences for food products (e.g., images or videos depicting texture and/or consistency of an egg yolk, textures and/or consistency of an egg white, images depicting exterior of a steak, images depicting an interior of a steak), end user account information (e.g., user cooking appliances and parameters therefor, user preferences, etc.), end user computing device information, or combinations thereof. In some embodiments, the database interface 952 may communicate with the data stores 120b-c, 420b-c via the networks 110.

Program modules, application programs, or data, or portions thereof, can be stored in other server computing system that are not show. For example, in some embodiments, or more Program modules, application programs, or data may be hosted by one or more cloud-computing services such as Amazon™ AWS. Those skilled in the relevant art will recognize that the network connections shown in FIG. 9 are only some examples of ways of establishing communications between computers, and other connections may be used, including wirelessly. In some embodiments, program modules, application programs, or data, or portions thereof, can even be stored in other computer systems or other devices (not shown).

The processor 906, system memory 908, network port 956 and database interface may be communicatively coupled to each other via the system bus 910, thereby providing connectivity between the above-described components. In alternative embodiments, the above-described components may be communicatively coupled in a different manner than illustrated in FIG. 9. For example, one or more of the above-described components may be directly coupled to other components, or may be coupled to each other, via intermediary components (not shown). In some embodiments, system bus 910 is omitted and the components are coupled directly to each other using suitable connections.

The computing device 102 can include any device, system or combination of systems and devices having at least wired or wireless communications capabilities. In most instances, the computing device 102 includes additional devices, systems, or combinations of systems and devices capable of providing graphical data display capabilities. Examples of such computing devices 102 can include without limitation, cellular telephones, smart phones, tablet computers, desktop computers, laptop computers, ultraportable or netbook computers, personal digital assistants, handheld devices, and the like.

The computing device 102 may include one or more processors 982 and non-transitory computer- or processor-readable media or memory, for instance one or more non-volatile memories 984 such as read only memory (ROM) or FLASH memory and/or one or more volatile memories 986 such as random access memory (RAM).

The computing device 102 may include one or more transceivers or radios 988 and associated antennas 990. For example, the computing device 102 may include one or more cellular transceivers or radios, one or more WIFI® transceivers or radios, and one or more BLUETOOTH® transceivers or radios, along with associated antennas. The computing device 102 may further include one or more wired interfaces (not shown) that utilize parallel cables, serial cables, or wireless channels capable of high speed communications, for instance, via one or more of FireWire®, Universal Serial Bus® (USB), Thunderbolt®, or Gigabyte Ethernet®, for example.

The computing device 102 may include a user input/output subsystem, for example including a touchscreen or touch sensitive display device 992 and one or more microphone/speakers 993. The touchscreen or touch sensitive display device 992 can include any type of touchscreen including, but not limited to, a resistive touchscreen or a capacitive touchscreen. The touchscreen or touch sensitive display device 992 may present a graphical user interface, for example in the form of a number of distinct screens or windows, which include prompts and/or fields for selection. The touchscreen or touch sensitive display device 992 may present or display individual icons and controls, for example virtual buttons or slider controls and virtual keyboard or key pads which are used to communicate instructions, commands, and/or data. While not illustrated, the user interface may additionally or alternatively include one or more additional input or output devices, for example, a microphone, a barometer (e.g., for altitude estimation), an alphanumeric keypad, a QWERTY keyboard, a joystick, scroll wheel, touchpad or similar physical or virtual input device. For example, the computing device 102 may include a microphone that allows for voice control of the computing device.

The computing device 102 may include one or more image capture devices 994, for example, cameras with suitable lenses, and optionally one or more flash or lights for illuminating a field of view to capture images. The image capture device(s) 994 may capture still digital images or moving or video digital images. Image information may be stored as files via the non-volatile memory 984, for example.

Some or all of the components within the computing device 102 may be communicably coupled using at least one bus 996 or similar structure adapted to transferring, transporting, or conveying data between the devices, systems, or components used within the computing device 102. The bus 996 can include one or more serial communications links or a parallel communications link such as an 8-bit, 16-bit, 32-bit, or 64-bit data bus. In some embodiments, a redundant bus (not shown) may be present to provide failover capability in the event of a failure or disruption of the primary bus 996.

The processor(s) 982 may include any type of processor (e.g., ARM Cortext-A8, ARM Cortext-A9, Snapdragon 600, Snapdragon 800, NVidia Tegra 4, NVidia Tegra 4i, Intel Atom Z2580, Samsung Exynos 5 Octa, Apple A7, Motorola X8) adapted to execute one or more machine executable instruction sets, for example a conventional microprocessor, a reduced instruction set computer (RISC) based processor, an application specific integrated circuit (ASIC), digital signal processor (DSP), or similar. Within the processor(s) 982, a non-volatile memory 984 may store all or a portion of a basic input/output system (BIOS), boot sequence, firmware, startup routine, and communications device operating system (e.g., iOS®, Android®, Windows® Phone, Windows® 8, and similar) executed by the processor 982 upon initial application of power. The processor(s) 982 may also execute one or more sets of logic or one or more machine executable instruction sets loaded from the volatile memory 986 subsequent to the initial application of power to the processor 982. The processor 982 may also include a system clock, a calendar, or similar time measurement devices. One or more geolocation devices, for example a Global Positioning System (GPS) receiver and one or more position sensing devices (e.g., one or more microelectromechanical systems or "MEMS" accelerometers, gyroscopes, etc.) that are not shown in FIG. 9 may be communicably coupled to the processor 982 to provide additional functionality such as geolocation data and three-dimensional position data to the processor 982.

The transceivers or radios 988 can include any device capable of transmitting and receiving communications via electromagnetic energy. Non-limiting examples of cellular communications transceivers or radios 988 include a CDMA transceiver, a GSM transceiver, a 3G transceiver, a 4G transceiver, an LTE transceiver, and any similar current or future developed computing device transceiver having at least one of a voice telephony capability or a data exchange capability. In at least some instances, the cellular transceivers or radios 988 can include more than one interface. For example, in some instances, the cellular transceivers or radios 988 can include at least one dedicated, full- or half-duplex, voice call interface and at least one dedicated data interface. In other instances, the cellular transceivers or radios 988 can include at least one integrated interface capable of contemporaneously accommodating both full- or half-duplex voice calls and data transfer.

Non-limiting examples of WiFi® transceivers or radios 988 include various chipsets available from Broadcom, including BCM43142, BCM4313, BCM94312MC, BCM4312, and chipsets available from Atmel, Marvell, or Redpine. Non-limiting examples of Bluetooth® transceivers or radios 988 include various chipsets available from Nordic Semiconductor, Texas Instruments, Cambridge Silicon Radio, Broadcom, and EM Microelectronic.

As noted, non-transitory computer- or processor-readable media can include non-volatile storage memory 984 and in some embodiments may include volatile memory 986 as well. At least a portion of the memory may be used to store one or more processor executable instruction sets for execution by the processor 982. In some embodiments, all or a portion of the memory may be disposed within the processor 982, for example in the form of a cache. In some embodiments, the memory may be supplemented with one or more slots configured to accept the insertion of one or more removable memory devices such as a secure digital (SD) card, a compact flash (CF) card, a universal serial bus (USB) memory "stick," or the like.

In at least some implementations, one or more sets of logic or machine executable instructions providing applications or "apps" executable by the processor 982 may be stored in whole or in part in at least a portion of the memory 984, 986. In at least some instances, the applications may be downloaded or otherwise acquired by the end user, for example using an online marketplace such as the Apple App Store, Amazon Marketplace, or Google Play marketplaces. In some implementations, such applications may start up in response to selection of a corresponding user selectable icon by the user or consumer. The application can facilitate establishing a data link between the computing device 102, system 120, 420, or the cooking appliance 404 via the transceivers or radios 988 and communication networks 110.

As discussed in more detail below, the application(s) may include logic or instructions to provide the end user with access to a number of graphical screens or windows with prompts, fields, and other user interface structures that allow the user 103 to input queries, receive responses, obtain food preparation instructions, control or guidance via systems 120, 420. Such may include, for example, logic or machine executable instructions for various screens or windows.

The cooking appliance 404 can include a device, system or combination of systems and devices that implement the disclosed functionality. In some implementations, the cooking appliance 404 has wired or wireless communications capabilities and includes additional devices, systems, or combinations of systems and devices capable of providing graphical data display capabilities. Examples of such cooking appliances can include without limitation, thermal immersion circulators and vessels, water ovens, baking ovens, induction cookers, and the like.

The cooking appliance 404 may include one or more processors 960 and non-transitory computer- or processor-readable media, for instance one or more nonvolatile memories 962 such as read only memory (ROM) or FLASH memory and/or one or more volatile memories 964 such as random access memory (RAM).

The cooking appliance 404 may include a cooking chamber 412 (e.g., a container, vessel) with one or more heaters 974 (e.g., as part of a thermal immersion circulator 414) positioned therein to, for example, heat a fluid (e.g., water, air) inside the cooking chamber 412. The cooking chamber 412 may be insulated and may include a selectively closable cover (e.g., lid, door, etc.). The cooking appliance 404 may also include one or more circulator(s) or circulator pumps 972 (e.g., as part of thermal immersion circulator 414) that stir a fluid in the cooking chamber 412. As discussed above, the cooking appliance 404 may also include one or more sensors or detectors 978 that sense or detect one or more characteristics, such as temperature, pressure, power, motion, fluid flow, presence or absence of a food product, etc. The circulator(s) 972, heater(s) 974, and sensor(s) 978 may be operatively coupled to the one or more processors 960. The sensors 978 may include one or more of a thermocouple, thermistor, platinum resistance temperature detector (RTD), positive temperature coefficient (PTC) heater/element, blackbody/infrared emissions detector, voltage sensor, current sensor (e.g., shunt resistor, current transformer, Hall effect sensor, magnetometer/GMR (giant magnetoresistive)), resistance sensor, barometer (e.g., for altitude estimation), etc.

The cooking appliance 404 may include one or more transceivers or radios 966 and associated antennas 968. For example, the cooking appliance 404 may include one or more cellular transceivers or radios, one or more WIFI® transceivers or radios, and one or more BLUETOOTH® transceivers or radios, along with associated antennas. The cooking appliance 404 may further include one or more wired interfaces (not shown) that utilize parallel cables, serial cables, or wireless channels capable of high speed communications, for instance, via one or more of FireWire®, Universal Serial Bus® (USB), Thunderbolt®, or Gigabyte Ethernet®, for example.

The cooking appliance 404 may include a user input/output subsystem 928, for example including a touchscreen or touch sensitive display device and one or more microphones/speakers. The touchscreen or touch sensitive display device can include any type of touchscreen including, but not limited to, a resistive touchscreen or a capacitive touchscreen. The touchscreen or touch sensitive display device may present a graphical user interface, for example in the form of a number of distinct screens or windows, which include prompts and/or fields for selection. The touchscreen or touch sensitive display device may present or display individual icons and controls, for example virtual buttons or slider controls and virtual keyboard or key pads which are used to communicate instructions, commands, and/or data. While not illustrated, the user interface may additionally or alternatively include one or more additional input or output devices, for example a microphone, an alphanumeric keypad, a QWERTY keyboard, a joystick, scroll wheel, touchpad or similar physical or virtual input device. For example, the cooking appliance 404 may include a microphone that allows for voice control of the cooking appliance and/or voice-based input of user queries.

Some or all of the components within the cooking appliance 404 may be communicably coupled using at least one bus 970 or similar structure adapted to transferring, transporting, or conveying data between the devices, systems, or components used within the cooking appliance 404. The bus 970 can include one or more serial communications links or a parallel communications link such as an 8-bit, 16-bit, 32-bit, or 64-bit data bus. In some embodiments, a redundant bus (not shown) may be present to provide failover capability in the event of a failure or disruption of the primary bus 970.

The processor(s) 960 may include any type of processor (e.g., ARM Cortext-A8, ARM Cortext-A9, Snapdragon 600, Snapdragon 800, NVidia Tegra 4, NVidia Tegra 4i, Intel Atom Z2580, Samsung Exynos 5 Octa, Apple A7, Motorola X8) adapted to execute one or more machine executable instruction sets, for example a conventional microprocessor, a reduced instruction set computer (RISC) based processor, an application specific integrated circuit (ASIC), digital signal processor (DSP), or similar. Within the processor(s) 960, a non-volatile memory may store all or a portion of a basic input/output system (BIOS), boot sequence, firmware, startup routine, and communications device operating system (e.g., iOS®, Android®, Windows® Phone, Windows® 8, and similar) executed by the processor 960 upon initial application of power. The processor(s) 960 may also execute one or more sets of logic or one or more machine executable instruction sets loaded from the volatile memory 964 subsequent to the initial application of power to the processor 960. The processor 960 may also include a system clock, a calendar, or similar time measurement devices. One or more geolocation devices, for example a Global Positioning System (GPS) receiver and one or more position sensing devices (e.g., one or more microelectromechanical systems or "MEMS" accelerometers, gyroscopes, etc.) that are not shown in FIG. 9 may be communicably coupled to the processor 960 to provide additional functionality such as geolocation data and three-dimensional position data to the processor 960.

The transceivers or radios 966 can include any device capable of transmitting and receiving communications via electromagnetic energy. Non-limiting examples of cellular communications transceivers or radios 966 include a CDMA transceiver, a GSM transceiver, a 3G transceiver, a 4G transceiver, an LTE transceiver, and any similar current or future developed computing device transceiver having at least one of a voice telephony capability or a data exchange capability. In at least some instances, the cellular transceivers or radios 966 can include more than one interface. For example, in some instances, the cellular transceivers or radios 966 can include at least one dedicated, full- or half-duplex, voice call interface and at least one dedicated data interface. In other instances, the cellular transceivers or radios 966 can include at least one integrated interface capable of contemporaneously accommodating both full- or half-duplex voice calls and data transfer.

Non-limiting examples of WiFi® transceivers or radios 966 include various chipsets available from Broadcom, including BCM43142, BCM4313, BCM94312MC, BCM4312, and chipsets available from Atmel, Marvell, or Redpine. Non-limiting examples of Bluetooth® transceivers or radios 966 include various chipsets available from Nordic Semiconductor, Texas Instruments, Cambridge Silicon Radio, Broadcom, and EM Microelectronic.

As noted, non-transitory computer- or processor-readable medium can include non-volatile storage memory and in some embodiments may include a volatile memory as well. At least a portion of the memory is used to store one or more processor executable instruction sets for execution by the processor 960. In some embodiments, all or a portion of the memory may be disposed within the processor 960, for example in the form of a cache. In some embodiments, the memory may be supplemented with one or more slots configured to accept the insertion of one or more removable memory devices such as a secure digital (SD) card, a compact flash (CF) card, a universal serial bus (USB) memory "stick," or the like.

In at least some implementations, one or more sets of logic or machine executable instructions providing programs executable by the processor 960 may be stored in whole or in part in at least a portion of the memory 962, 964. In at least some instances, the applications may be downloaded or otherwise acquired by the end user, for example using an online marketplace. In some implementations, such applications may start up in response to selection of a corresponding user selectable icon by the user or consumer. The application can facilitate establishing a data link between the cooking appliance 404, systems 120, 420, and/or the computing device 102 via the transceivers or radios 966 and communication networks 110.

In some implementations, some of the components of the cooking appliance 404 may be embodied in a computing device separate from the cooking chamber 412, such as in the example shown in FIG. 4A. In some embodiments, the cooking appliance 404 may be an integrated device that includes some or all of the aforementioned components. Further, it should be appreciated that although certain functions are described herein as being implemented in one of the client computing device 102, the cooking appliance 404, and/or systems 120, 420, some or all of such functions may be performed by numerous combinations of these devices, or may be performed in a different one or more of the devices than described above. In other words, the functionality described herein may be implemented in a highly distributed manner or may be implemented in a single self-contained device.

What is claimed is:
1. A system comprising:
a processing unit; and
a memory unit communicatively coupled to the processing unit, the memory unit including instructions, which when executed by the processing unit, cause the system to:
receive a first user query from a first user;
determine if a response is available that matches an intent of the first user query above a threshold level of confidence;
enable access to the first user query to a plurality of other users if an automated response is not available that matches the intent of the first user query above the threshold level of confidence;
receive one or more user responses to the first user query from one or more of the plurality of other users;
output, to the first user, the one or more user responses to the first user query;
receive feedback from the first user regarding the output of the one or more user responses, wherein the feedback includes an indication that a particular response, from the one or more user responses, sufficiently answers the first user query;
store data corresponding to the particular response in a data repository
wherein storing the data corresponding to the particular response in the data repository includes applying a tag to the data corresponding to the particular response, the tag indicative that the particular response is supplied by another user;
receive a second user query from a second user, the second user query similar to the first user query;

determine, using a machine learning model, that the particular response to the first user query matches an intent of the second user query above the threshold level of confidence; and output the particular response to the second user, the output including the tag indicative that the particular response is supplied by another user.

2. The system of claim 1, wherein receiving the first user query from the first user comprises:

receiving a message from the first user; and interpreting, using natural language processing, the received message as the first user query.

3. The system of claim 2, wherein the message received from the first user includes a text message and/or an audio message.

4. The system of claim 1, wherein enabling access to the first user query to the plurality of other users includes:

prompting the first user for permission to enable access to the first user query to other users; and receiving a confirmation indicative of permission to enable access to the first user query to other users.

5. The system of claim 1, wherein the memory unit includes further instructions, which when executed by the processing unit, cause the system to further:

train the machine learning model based on the feedback received from the first user.

6. The system of claim 1, wherein storing the data corresponding to the particular response in the data repository includes:

associate the data corresponding to the particular response with data corresponding to the first user query and/or data corresponding to one or more other user queries that are similar to the first user query.

7. The system of claim 1, wherein enabling access to the first user query includes posting the first user query using any of:

a chatbot;

an online forum; or a social media platform.

8. The system of claim 1, wherein the first user query relates to any of:

food;

food preparation; or operation of a cooking appliance.

9. The system of claim 1, wherein the message is received from the first user via any of:

a client computing device; or a cooking appliance.

10. The system of claim 1, wherein the one or more responses are output to the first user via any of:

a client computing device; or a cooking appliance.

11. A method comprising:

receiving a first user query from a first user;

determining if a response is available that matches an intent of the first user query above a threshold level of confidence;

prompting the first user for permission to enable access to the first user query to a plurality of other users if a response is not available that matches the intent of the first user query above the threshold level of confidence;

enabling access to the first user query to the plurality of other users in response to receiving a confirmation of permission from the first user;

receiving one or more user responses to the first user query from one or more of the plurality of other users;

outputting, to the first user, the one or more user responses to the first user query;

receiving feedback from the first user regarding the output of the one or more user responses;

determining, based on the received feedback from the first user, that a particular user response of the output one or more user responses answers the first user query;

receiving a second user query from a second user, the second user query similar to the first user query;

determining that the particular user response to the first user query matches an intent of the second user query above the threshold level of confidence; and outputting the particular user response to the second user.

12. The method of claim 11, wherein receiving the first user query from the first user includes:

receiving a message from the first user; and interpreting, using natural language processing, the received message as the first user query.

13. The method of claim 11, further comprising:

training a machine learning model based on the feedback received from the first user.

14. The method of claim 11, further comprising:

storing data corresponding to user query and one or more of the output user responses in a repository based on the received feedback from the first user.

15. The method of claim 11, wherein the first user query relates to any of:

food;

food preparation; or operation of a cooking appliance.

16. A food preparation guidance system comprising:

a network interface through which to communicate, via a computer network, with a client computing device and a cooking appliance, the food preparation guidance system operable to receive inputs from the client computing device and control a cooking process by the cooking appliance based on the inputs from the user computing device;

a processing unit communicatively coupled to the network interface; and a memory unit communicatively coupled to the processing unit, the memory unit including instructions, which when executed by the processing unit, cause the food preparation guidance system to:

receive, via the network interface, a message from a user;

interpret, using natural language processing, the received message as a user query corresponding to food preparation;

determine if a response is available that matches an intent of the user query above a threshold level of confidence;

prompt the user to enable access to the user query to a plurality of other users if a response is not available that matches the intent of the first user query above the threshold level of confidence;

enable access to the user query to the plurality of other users in response to receiving a confirmation of permission from the user;

receive one or more user responses to the user query from one or more of the plurality of other users;

output, to the first user, the received one or more user responses to the user query; and receive feedback, from the user, regarding the output one or more user responses, the feedback including an indication that a particular user response, of the received one or more user responses, satisfactorily answers the user query corresponding to food preparation.

17. The food preparation guidance system of claim 16, wherein the memory unit includes further instructions, which when executed by the processing unit, cause the food preparation guidance system to:

train a machine learning model based on the feedback received from the user.

18. The food preparation guidance system of claim 16, wherein enabling access to the user query includes posting the user query using any of:

a chatbot;

an online forum; or a social media platform.

19. The food preparation guidance system of claim 16, wherein the message received from the user includes a text message and/or an audio message.

20. The food preparation guidance system of claim 16, wherein the memory unit includes further instructions, which when executed by the processing unit, cause the food preparation guidance system to:

output, to the user, a particular available response to the user query before prompting the user to enable access to the user query to the plurality of other users, if the particular available response matches the intent of the user query above the threshold level of confidence.

21. The food preparation guidance system of claim 16, wherein the message is received via any of:

the client computing device; or the cooking appliance.

22. The food preparation guidance system of claim 16, wherein the one or more received user responses are output to the user via any of:

the client computing device; or the cooking appliance.

23. The food preparation guidance system of claim 16, wherein the user query relates to any of:

food;

food preparation; or operation of the cooking appliance.

\* \* \* \* \*